United States Patent [19]
Anzai et al.

[11] Patent Number: 5,429,166
[45] Date of Patent: Jul. 4, 1995

[54] APPARATUS FOR REGULATING THE PNEUMATIC PRESSURE OF A MOTOR VEHICLE TIRE

[75] Inventors: Hidenobu Anzai, Iwaki; Moritaka Gotoh, Chiba; Minoru Tanaka, Iwaki, all of Japan

[73] Assignee: Fujikura Ltd., Tokyo, Japan

[21] Appl. No.: 121,303

[22] Filed: Sep. 14, 1993

[30] Foreign Application Priority Data

Sep. 28, 1992 [JP] Japan ................... 4-258649
Sep. 28, 1992 [JP] Japan ................... 4-258652

[51] Int. Cl.$^6$ ........................................ B60C 23/00
[52] U.S. Cl. ..................... 152/415; 141/4; 141/96; 141/197; 364/558; 340/442
[58] Field of Search ........... 152/415, 416, 417, 418; 141/4, 95, 96, 38, 197; 137/487.5, 228; 364/558; 340/442

[56] References Cited

U.S. PATENT DOCUMENTS

| | | |
|---|---|---|
| 2,747,640 | 5/1956 | Kress .................. 152/417 |
| 4,456,038 | 6/1984 | Gwaltney et al. .......... 141/95 |
| 4,614,479 | 9/1986 | Liu .................. 152/415 X |
| 4,748,845 | 6/1988 | Rocco et al. .......... 73/146.8 |
| 4,763,709 | 8/1988 | Scholer .................. 152/416 |
| 4,776,766 | 10/1988 | Brent .................. 152/415 X |
| 4,782,878 | 11/1988 | Mittal .................. 152/417 |
| 4,862,938 | 9/1989 | Mittal .................. 152/417 |
| 4,872,492 | 10/1989 | McAnally et al. .......... 141/38 |
| 4,875,509 | 10/1989 | Da Silva .................. 152/415 X |
| 4,905,742 | 3/1990 | Mohs .................. 152/416 X |
| 4,998,438 | 3/1991 | Martin .................. 73/146.8 |
| 5,141,589 | 8/1992 | Mittal .................. 152/415 |
| 5,180,456 | 1/1993 | Schultz et al. .......... 152/416 |
| 5,249,609 | 10/1993 | Walker et al. .......... 152/415 X |

FOREIGN PATENT DOCUMENTS

| | | |
|---|---|---|
| 2548780 | 1/1985 | France . |
| 3328280 | 1/1985 | Germany . |
| 60-53451 | 3/1985 | Japan . |

*Primary Examiner*—Michael W. Ball
*Assistant Examiner*—Francis J. Lorin
*Attorney, Agent, or Firm*—Frishauf, Holtz, Goodman & Woodland

[57] ABSTRACT

An apparatus for regulating the pneumatic pressure of a tire according to the invention calculates the pressure difference between the specified pneumatic pressure entered therein through an input section and the actual pneumatic pressure of a tire measured by a pressure sensor and operates its air charging or discharging valve by specifying an extent of openness of the valve and a time for keeping the valve open as a function of the obtained pressure difference. Thereafter, it calculates the rate of change in the pneumatic pressure of the tire from the actual pneumatic pressure of the tire measured for the second time during the valve is kept open and, at the same time, the pressure difference between the specified pneumatic pressure value and the actual pneumatic pressure of the tire measured for the second time. Then, it calculates second time for keeping the valve open by dividing the pressure difference by the rate of change in the pneumatic pressure of the tire and operates its air charging or discharging valve by specifying for the second time the time for keeping the valve open while keeping the extent of openness of the valve same as that for the first time.

8 Claims, 35 Drawing Sheets

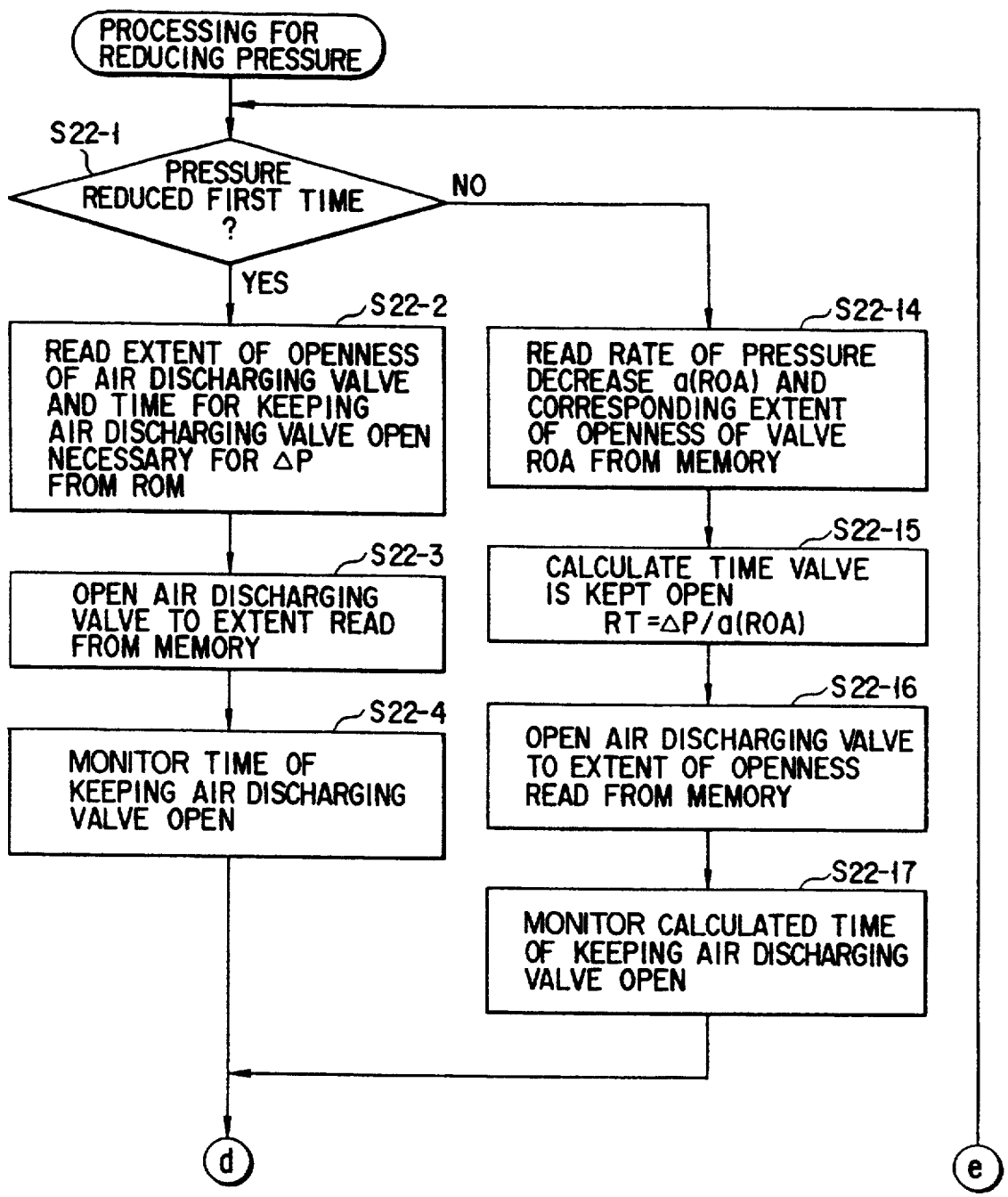
F I G. 7A

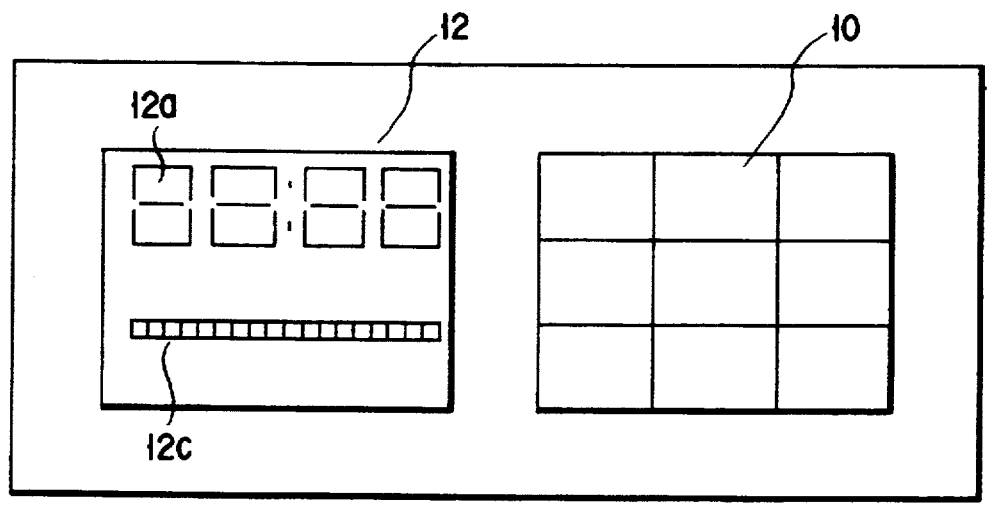
F I G. 13
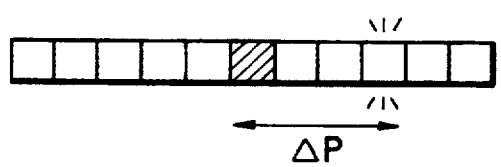
F I G. 14
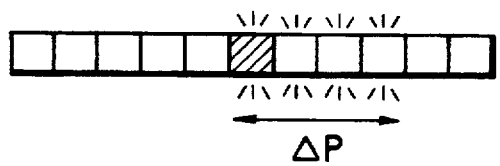
F I G. 15

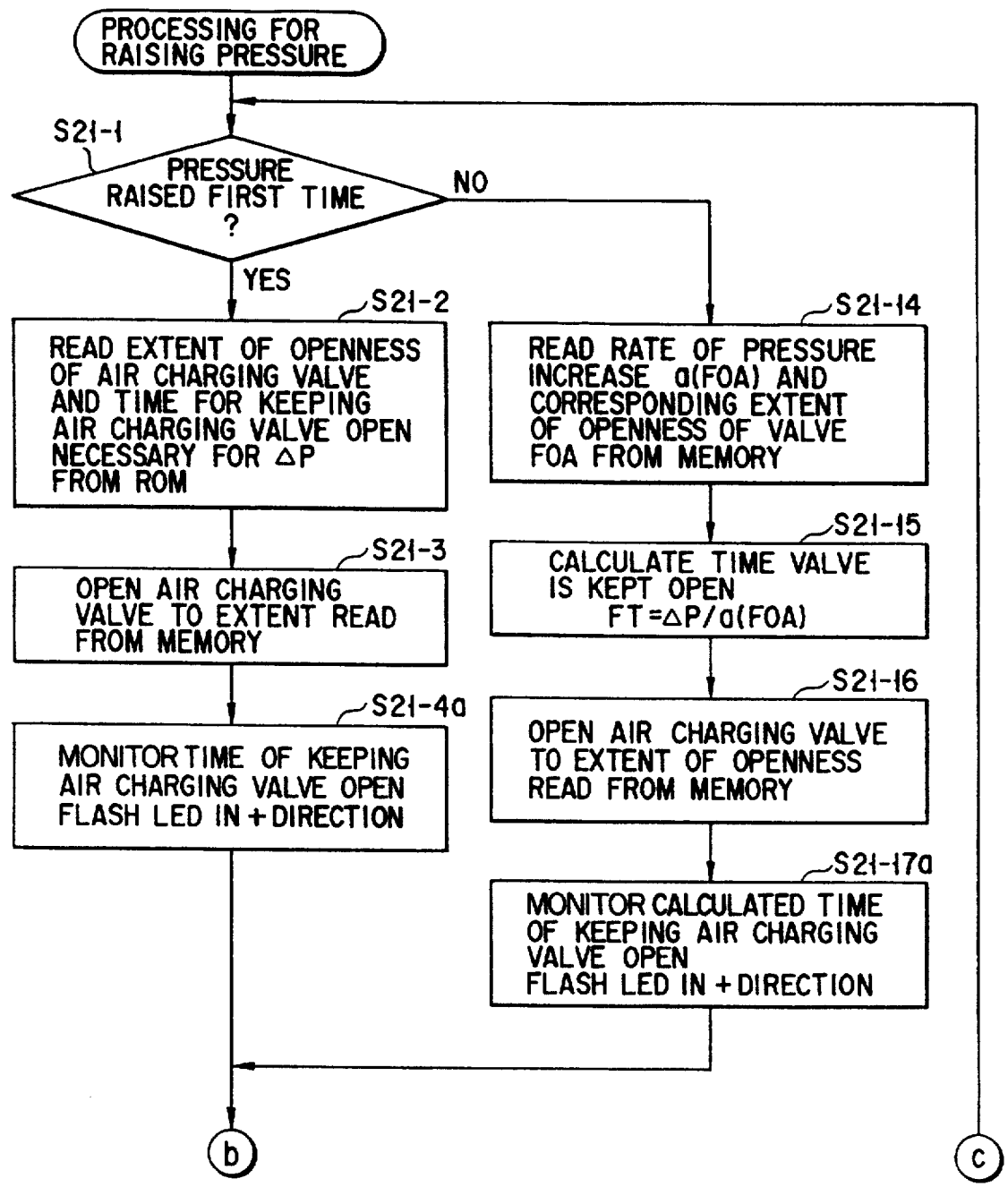
F I G. 16A

F I G. 18A 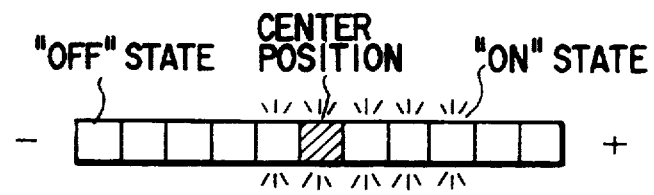
F I G. 18B 
F I G. 18C 
F I G. 18D 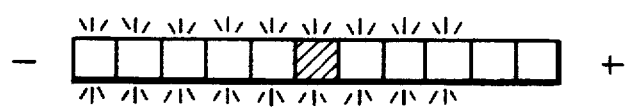
F I G. 18E 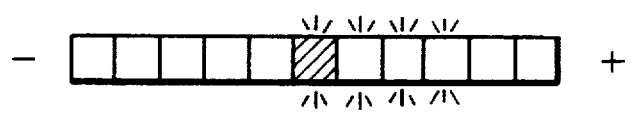

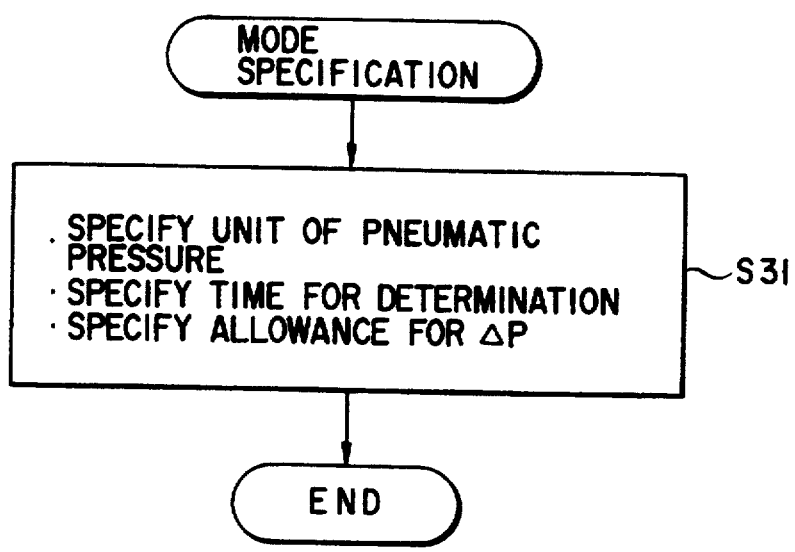
F I G. 20

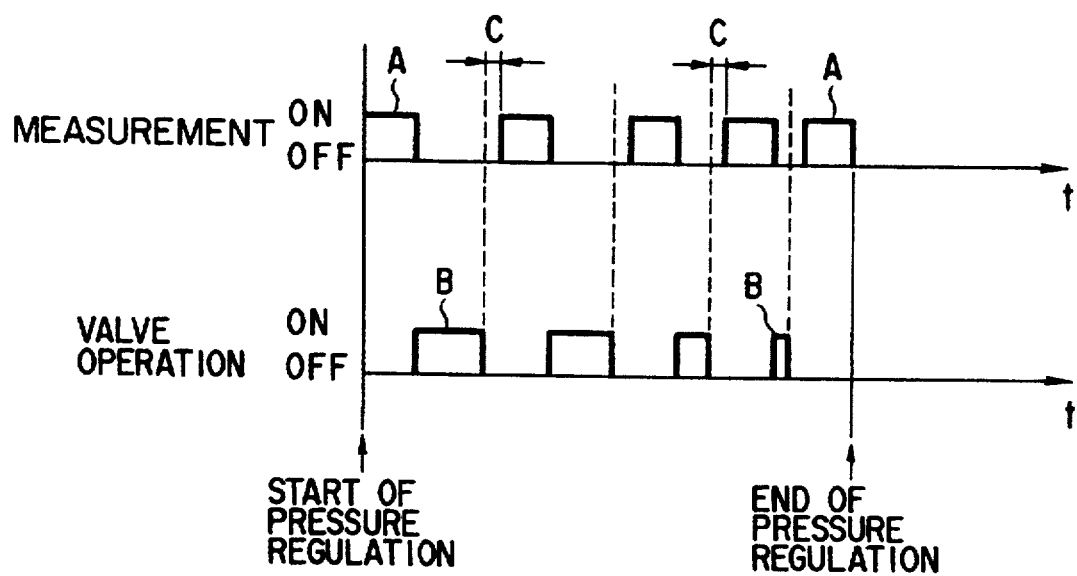
F I G. 24

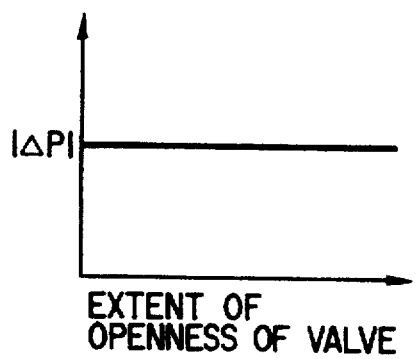
F I G. 27
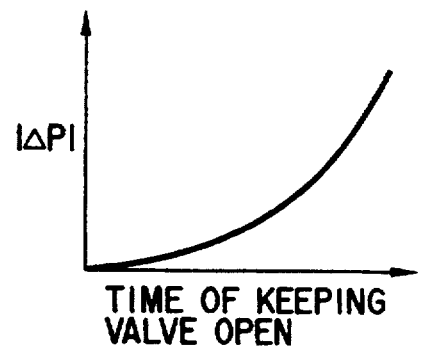
F I G. 28
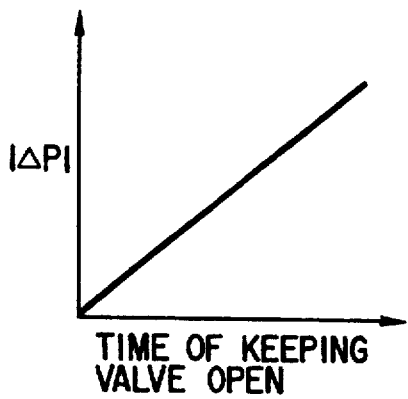
F I G. 29
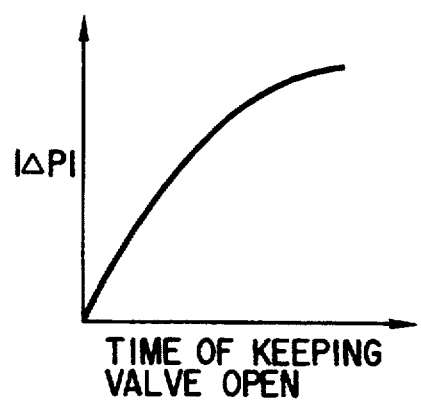
F I G. 30
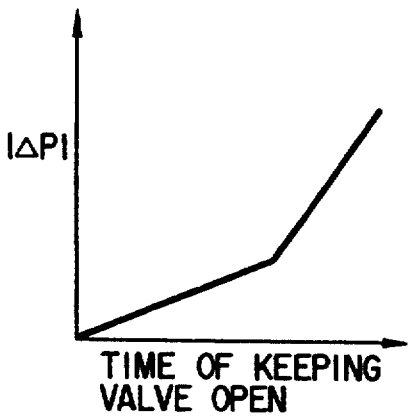
F I G. 31
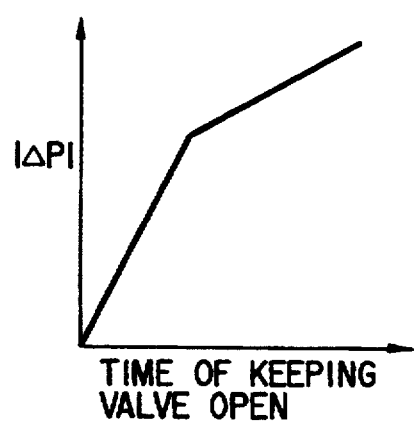
F I G. 32

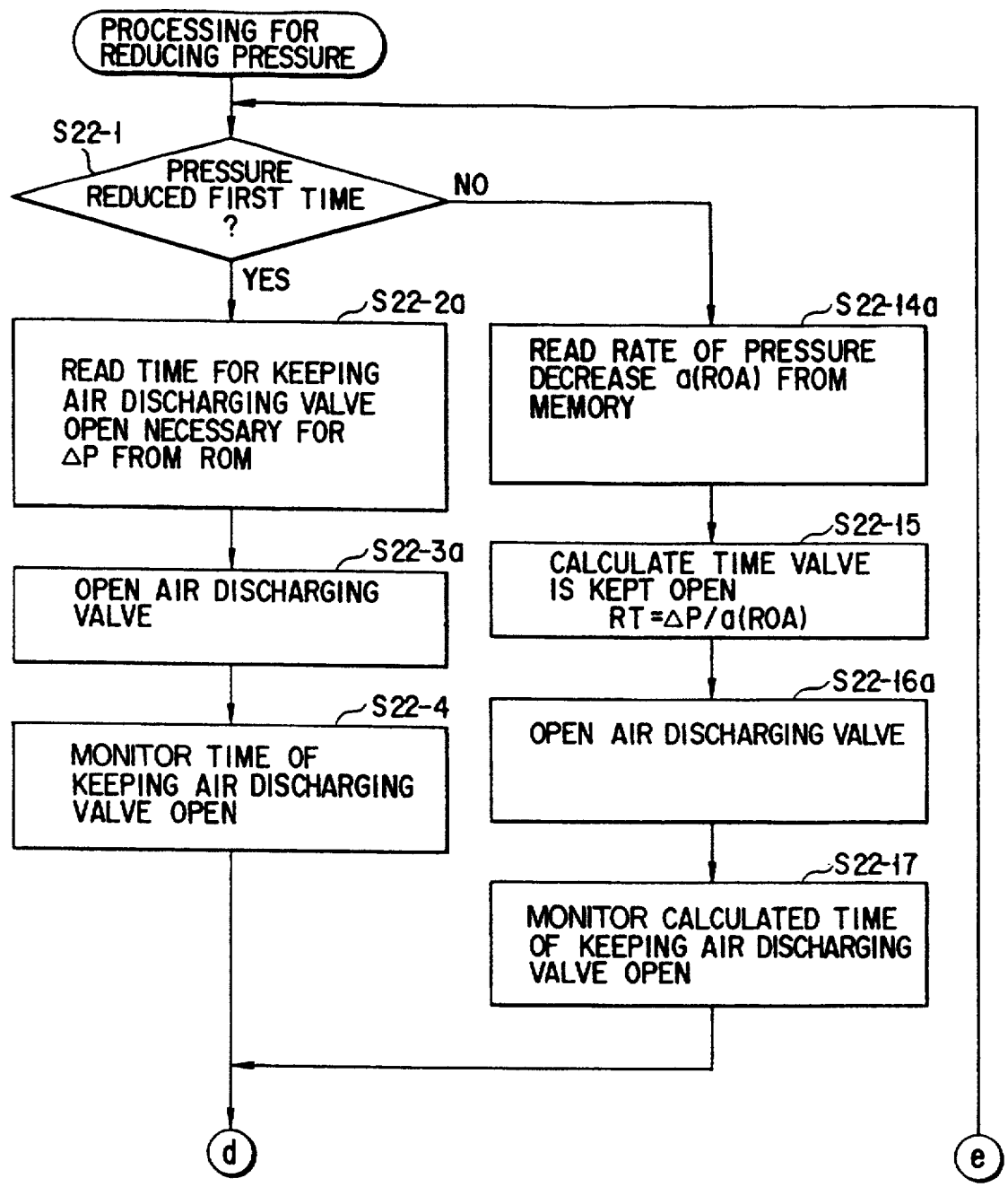
F I G. 34A

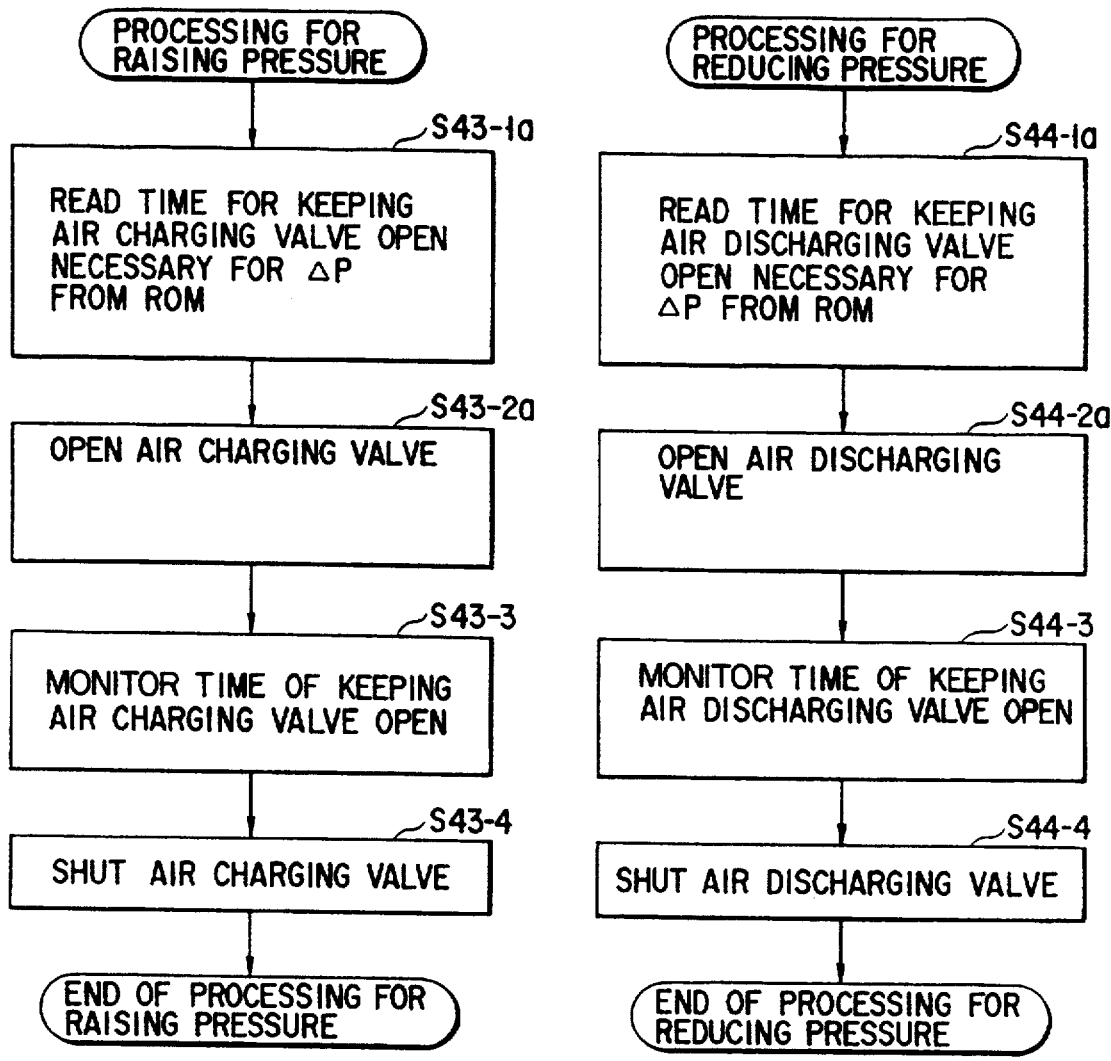
F I G. 37    F I G. 38

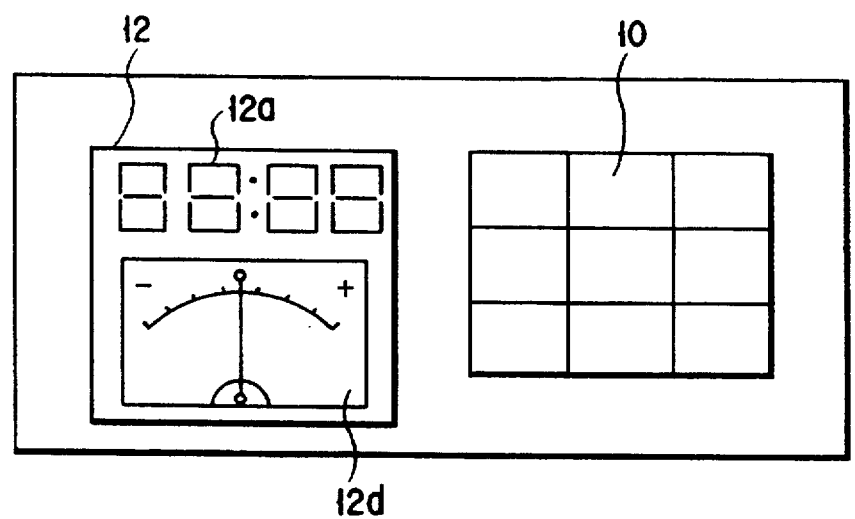
F I G. 50

APPARATUS FOR REGULATING THE PNEUMATIC PRESSURE OF A MOTOR VEHICLE TIRE

BACKGROUND OF THE INVENTION

1. Field of the Invention

This invention relates to an apparatus for regulating the pneumatic pressure of a motor vehicle tire by charging a tire with air or discharging air from the tire.

2. Description of the Related Art

Well known systems for modifying the pneumatic pressure of a motor vehicle tire in response to the condition of the motor vehicle are disclosed in U.S. Pat. No. 4,782,878, 4,862,938 and 5,141,589.

With any of these disclosed systems, the pneumatic pressure of a tire is controlled to show a specified pressure level. If the actual pneumatic pressure of the tire is lower than the specified value, an inflation valve of the system is held open for a given period of time, whereas a deflation valve of the system is held open for a given period of time if the pneumatic pressure of the tire is higher than the specified value. The operation of opening the inflation valve or the deflation valve is repeated until the actual pneumatic pressure of the tire becomes equal to the specified pressure.

Since the inflation valve or the deflation valve is kept open for a predetermined period of time with any of the disclosed systems, the valves normally need to be driven to open or close frequently, spending considerable time, until the pneumatic pressure of the tire finally becomes equal to the specified pressure.

SUMMARY OF THE INVENTION

It is therefore an object of the present invention to provide an apparatus for regulating the pneumatic pressure of a motor vehicle tire that can make the pneumatic pressure of the tire equal to a specified pressure level with a reduced number of operations of driving the inflation and deflation valves of the apparatus and thereby reduce the time required for the overall pneumatic pressure regulating operation.

According to the invention, the above object and other objects of the invention are achieved by providing an apparatus for regulating the pneumatic pressure of a tire comprising:

a pneumatic pressure source for storing compressed air;

connecting means adapted to open a tire valve of a tire once connected thereto;

input means for entering a specified pneumatic pressure value into memory means of the apparatus;

pneumatic pressure measuring means for measuring the pneumatic pressure of the tire;

an air charge valve for allowing or preventing communication between the connecting means and the pneumatic pressure source;

an air discharge valve for allowing or preventing communication between the connecting means and the atmosphere;

valve drive means for controlling the amount of operation of the air charge valve and that of the air discharge valve;

memory means for storing a value representing the operation of the valves to be performed as a function of the pressure difference between the entered specified pneumatic pressure value and the pneumatic pressure level of the tire measured by the pneumatic pressure measuring means; and control means for reading the stored value representing the operation of the valves to be performed as a function of the pressure difference between the entered specified pneumatic pressure value and the pneumatic pressure level of the tire measured by the pneumatic pressure measuring means and raising or reducing the pneumatic pressure of the tire by controlling the valve drive means in accordance with the value representing the operation of the valves to be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 7A is a portion of a flow chart illustrating a pneumatic pressure reducing operation of the first embodiment;

FIG. 13 is a schematic plan view of the display unit of a second embodiment of apparatus for regulating the pneumatic pressure of a motor vehicle tire of the present invention;

FIG. 14 is a schematic illustration showing an aspect of a typical operation of the light emitting elements of the second embodiment;

FIG. 15 is a schematic illustration similar to FIG. 14 but showing another aspect of the operation of the light emitting elements;

FIG. 16A is a portion of a flow chart illustrating a pneumatic pressure raising operation of the second embodiment;

FIGS. 18A through 18E are schematic illustrations showing different aspects of an exemplary operation of the light emitting elements of the second embodiment;

FIG. 20 is a flow chart of mode specifying operation of a third embodiment of the invention;

FIG. 24 is a time chart showing the relationship between the signal output timing for the measured pneumatic pressure level and the signal output timing for the valve control operation of the third embodiment;

FIGS. 27 through 32 are graphs showing different relationships between the absolute value of the pressure difference ΔP between the specified pneumatic pressure level and the measured pneumatic pressure level of a motor vehicle tire and the extent of openness of a valve of a fifth embodiment of the invention at the time of the initial specification of a pneumatic pressure level;

FIGS. 34A and 34B are portions of a flow chart illustrating a pneumatic pressure reducing operation of the fifth embodiment;

FIG. 37 is a flow chart illustrating a pneumatic pressure raising operation of a seventh embodiment of the invention;

FIG. 38 is a flow chart illustrating a pneumatic pressure reducing operation of the seventh embodiment of the invention;

FIG. 50 is a plan view of an alternative display unit of an apparatus for regulating the pneumatic pressure of a motor vehicle tire according to the invention.

DETAILED DESCRIPTION OF THE PREFERRED EMBODIMENTS

Now, the present invention will be described in greater detail by referring to the accompanying drawings that illustrate preferred embodiments of the invention.

Figure 1:
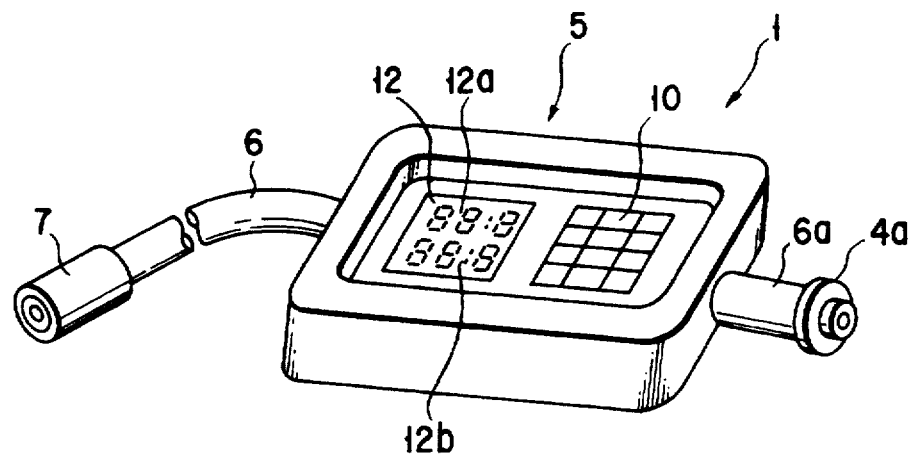
FIG. 1 is a schematic perspective view of a first embodiment of apparatus for regulating the pneumatic pressure of a motor vehicle tire of the invention.
Figure 2:
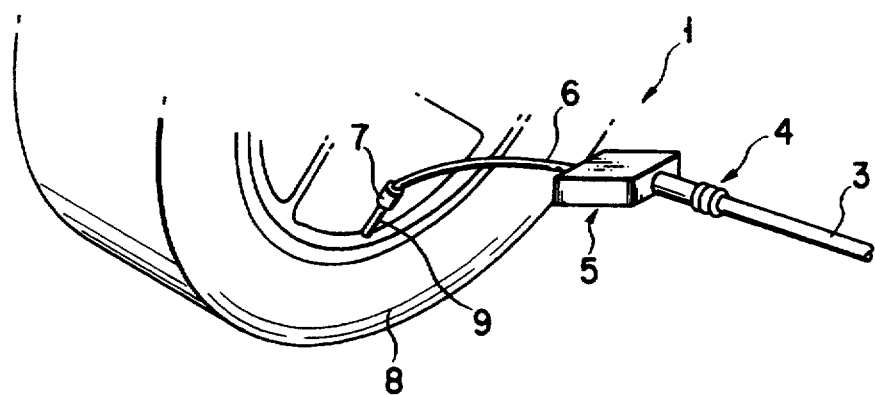
FIG. 2 is a schematic perspective view of the first embodiment of apparatus connected to a motor vehicle tire.
Figure 3:
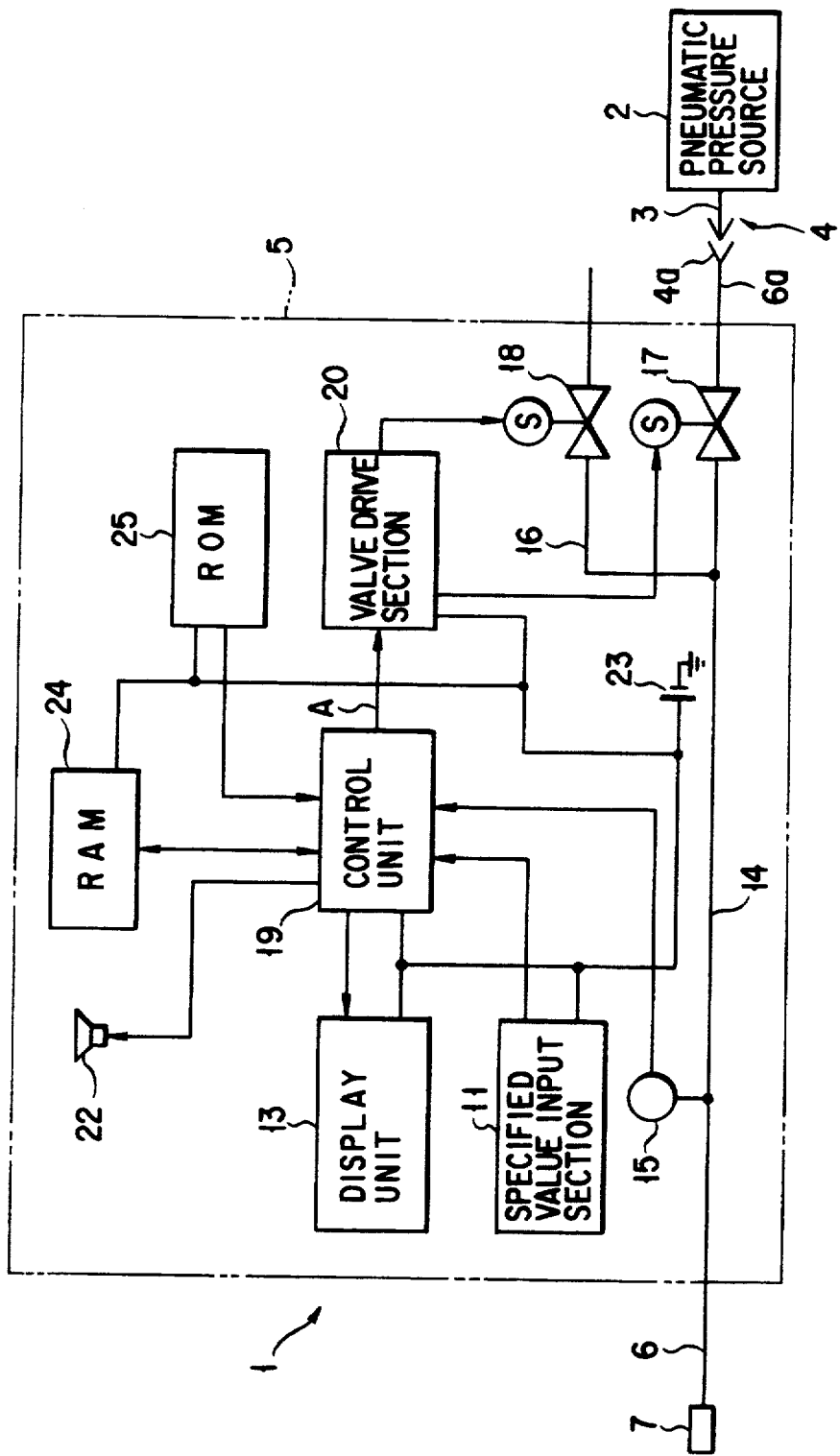
FIG. 3 is a block diagram of the first embodiment of apparatus for regulating pneumatic pressure of a motor vehicle tire.
Figure 4:
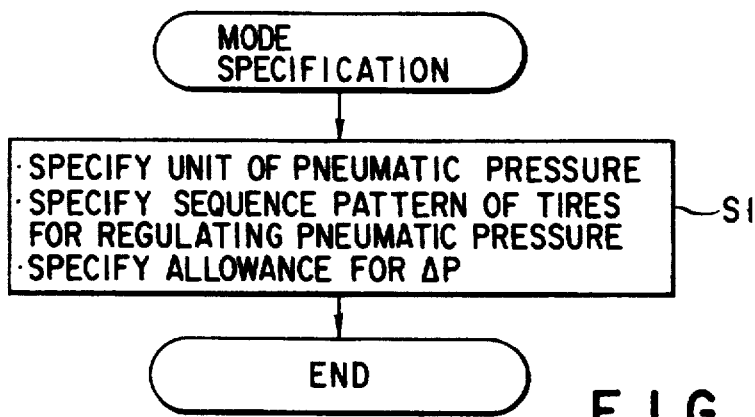
FIG. 4 is a flow chart of mode specifying operation of the first embodiment.
Figure 5A:
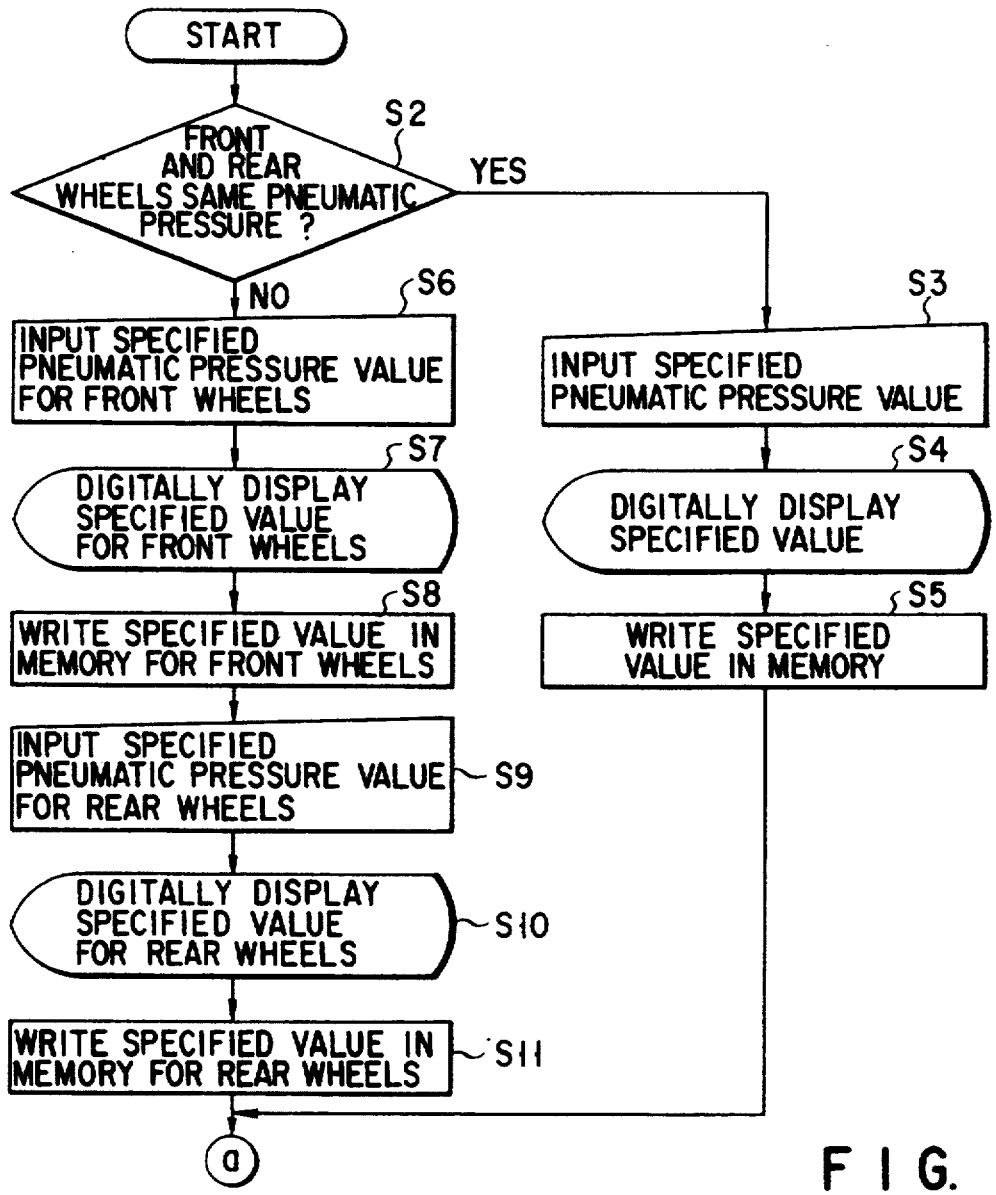
FIG. 5A is a portion of a flow chart illustrating a pneumatic pressure regulating operation of the first embodiment.
Figure 5B:
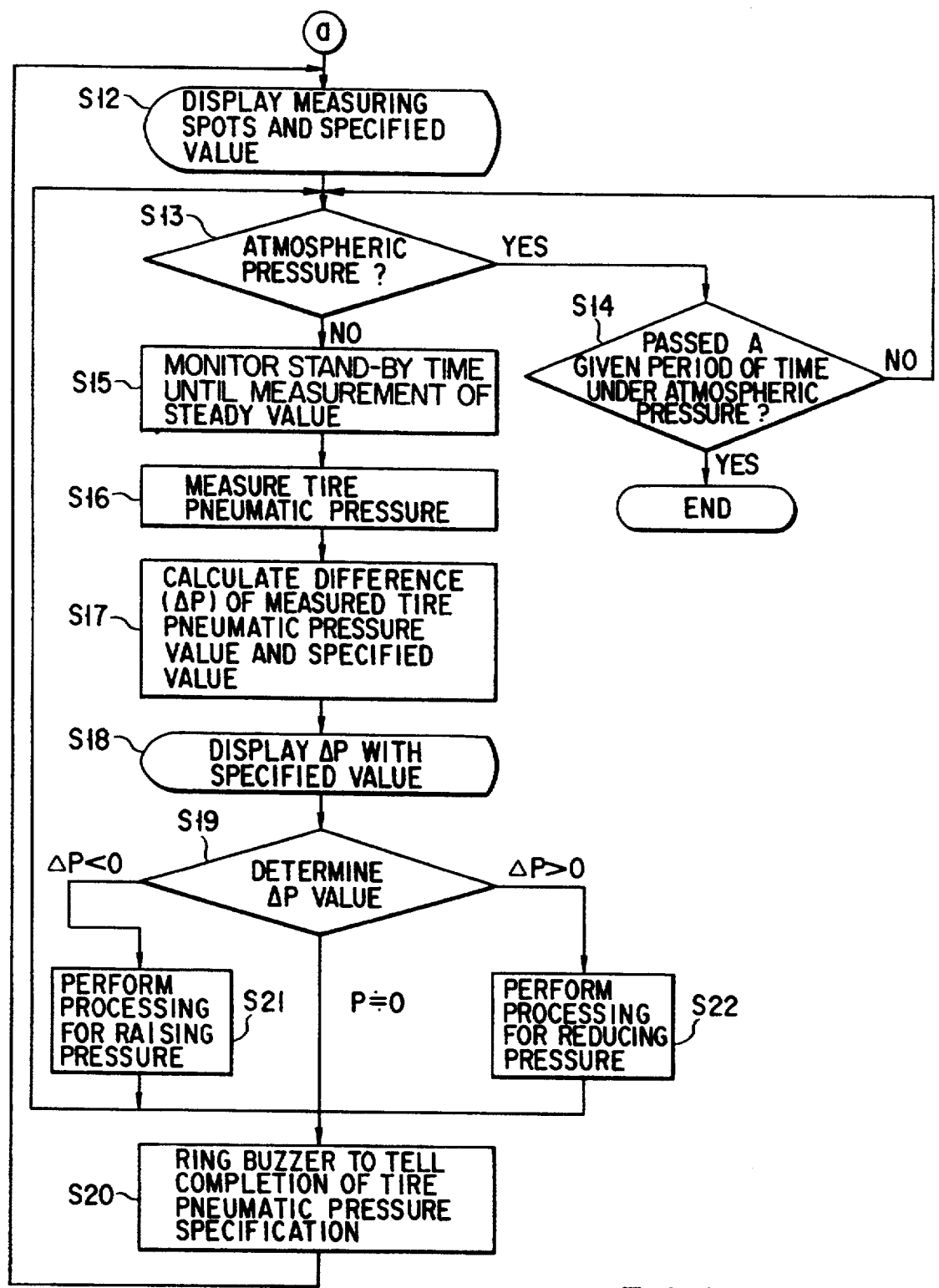
FIG. 5B is the remaining portion of the flow chart of FIG. 5A illustrating a pneumatic pressure regulating operation of the first embodiment.

Referring firstly to FIGS. 1 through 3, illustrating a first embodiment of the invention, an apparatus 1 for regulating the pneumatic pressure of a motor vehicle tire 8 is connected by means of a coupler 4 to the proximal end of a pressure supply hose 3, which is by turn connected to a pneumatic pressure source 2. The apparatus 1 comprises a pneumatic pressure regulating unit 5 designed to receive at a side thereof a coupling nipple 4a of said coupler 4 to connect itself to a corresponding end of said coupler 4, a linkage hose 6 made of pressure-resistant rubber and arranged on a side of the pneumatic pressure regulating unit 5 opposite to the side for receiving said coupling nipple 4a and a tire valve connecting section 7 fitted to the distal end of said linkage hose 6 and located close to said pneumatic pressure regulating unit 5. The tire valve connecting section 7 is always held open and, once connected to the tire valve 9 of a motor vehicle tire 8 by the operator of the apparatus 1, renders the tire valve 9 open so that the inside of the motor vehicle tire 8 comes to communicate with the inside of the pneumatic pressure regulating unit 5. More specifically, the coupling nipple 4a is fitted to an end of the air inlet pipe 6a connected to the corresponding side of said pneumatic pressure regulating unit 5.

The pneumatic pressure regulating unit 5 comprises a specified value input section 11 having value specifying buttons 10 arranged on the upper surface thereof and a display unit 13 having a display window 12 provided with digital display members 12a, 12b for displaying the difference of a measured pneumatic pressure value and a specified pneumatic pressure value (which will be described hereinafter) of the motor vehicle tire 8.

A passageway 14 is formed within the pneumatic pressure regulating unit 5 to hold the pressure supply hose 3 in communication with the linkage hose 6 and provided with a pressure sensor 15 that determines the actual pneumatic pressure of the tire 8 by measuring the pneumatic pressure in the passageway 14. The passageway 14 has a branch way 16 diverging from the passageway 14 at a point located closer to the pneumatic pressure source 2 than the pressure sensor 15 and is provided with an air charging valve 17 at a point located closer to the pneumatic pressure source 2 than the point of divergence of the branch way 16, said air charging valve 17 being controlled for the extent of openness. Said branch way 16 by turn is provided with an air discharging valve 18, which is controlled for the extent of openness.

Said air charging valve 17 and air discharging valve 18 are connected to a valve drive section 20 that selectively drives said valve 17 or 18 to open or close in a controlled manner and regulates the extent of openness of said valve 17 or 18 in accordance with control signal A transmitted from a control unit 19, which will be described hereinafter.

The control unit 19 typically comprises one or more than one microprocessors and connected to said specified value input section 11, display unit 13, valve drive section 20 and pressure sensor 15 as well as to a buzzer 22, a RAM 24 and a ROM 25. Said specified value input section 11, display unit 13, control unit 19, valve drive section 20, buzzer 22, RAM 24 and ROM 25 are connected to a battery 23 that supplies power to these components. Said battery 23 is provided with an ON/OFF power switch (not shown).

Figure 10:
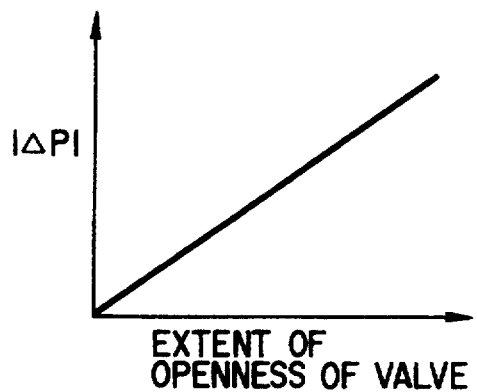
FIG. 10 is a graph showing a typical relationship between the absolute value of the pressure difference ΔP between the specified pneumatic pressure level and the measured pneumatic pressure level of a motor vehicle tire and the extent of openness of a valve of the first embodiment at the time of the initial specification of a pneumatic pressure level.
Figure 11:
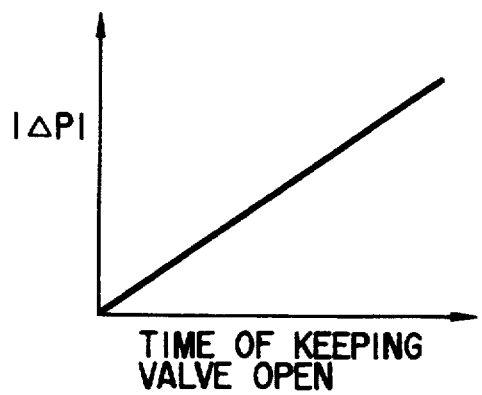
FIG. 11 is a graph showing a typical relationship between the absolute value of the difference ΔP between the specified pneumatic pressure level and the measured pneumatic pressure level of a motor vehicle tire and the duration of time of keeping a valve of the first embodiment open at the time of the initial specification of a pneumatic pressure level.
Figure 12:
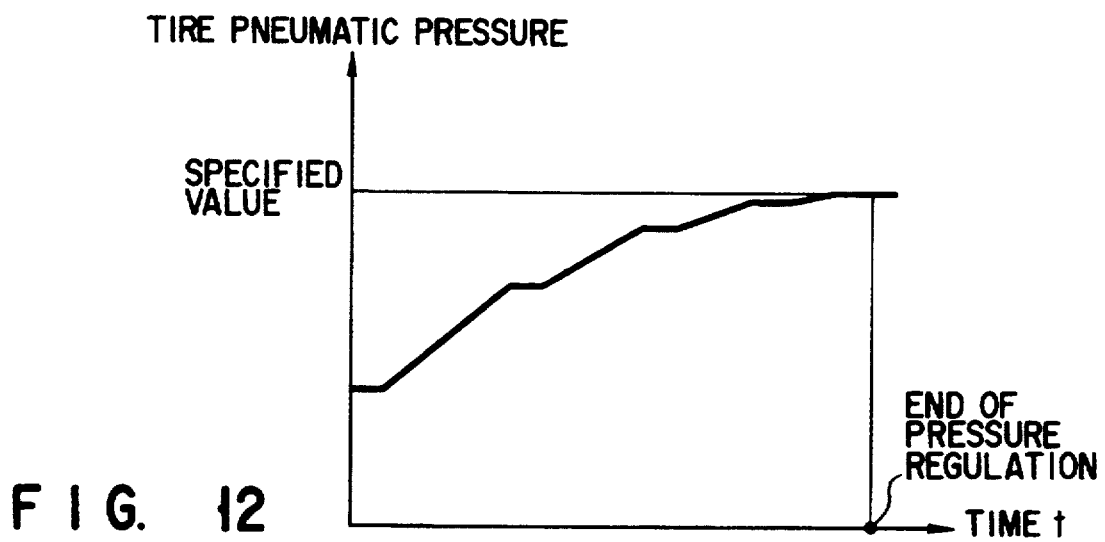
FIG. 12 is a graph showing the relationship between the time for regulating the pneumatic pressure of a motor vehicle tire by using the first embodiment and the pneumatic pressure of the tire.

Said ROM 25 stores a control program as illustrated in the flow charts of FIGS. 4 through 7B, which will be described hereinafter, along with map data including those for a graph showing a typical relationship between the absolute value of the pressure difference $\Delta P$ between the specified pneumatic pressure level and the measured pneumatic pressure level of a motor vehicle tire and the extent of openness of a valve of the first embodiment at the time of the initial specification of a pneumatic pressure level as illustrated in FIG. 10 and a graph showing a typical relationship between the absolute value of the difference $\Delta P$ between the specified pneumatic pressure level and the measured pneumatic pressure level of a motor vehicle tire and the duration of time of keeping a valve of the first embodiment open at the time of the initial specification of a pneumatic pressure level as illustrated in FIG. 11.

Now, the operation of the above first embodiment and particularly that of the control unit 19 will be described by referring to the flow charts of FIGS. 4 through 7B. Note that it is assumed in the flow charts that the apparatus for regulating the pneumatic pressure of a motor vehicle tire 1 is already connected to a pneumatic pressure source 2 and the power switch is already on.

[Step S1]

Before starting an operation of regulating the pneumatic pressure of a tire 8, the operator specifies a mode of operation, using appropriate ones of the value specifying buttons 10 of the specified value input section 11, in order to define some of the basic parameters for the operation, including the unit of pneumatic pressure, the sequence according to which the tires of a motor vehicle are handled for pneumatic pressure regulation (typically selected from five alternative sequences of (1) F→F→R→R, (2) F→R→R→F, (3) R→R→F→F, (4) R→F→F→R and (5) as defined by the operator on the spot, where F and R stand for a front tire and a rear tire respectively), the time expressed in minutes that needs to pass under the atmospheric pressure before determining the end of operation in [Step S14] as described hereinafter and allowance E for determining the pressure difference $\Delta P$ which will also be described hereinafter. These parameters are stored in the RAM 24 even after the power switch is turned off so that the same parameters are selected when the switch is turned on next time.

[Step S2]

The question if the front and rear wheel tires need to have a same pneumatic pressure is externally answered by way of the specified value input section 11. If the answer to this question is yes, the operation proceeds to [Step S3], whereas it proceeds to [Step S6] if the answer is negative.

[Step S3]

As the operator enters a pneumatic pressure value for all the front and rear wheel tires 8, using one or more than one of the value specifying buttons 10, the specified value input section 11 transmits a digital signal representing the specified pneumatic pressure value to the control unit 19. After entering the pneumatic pressure value, the operator connects the tire valve connecting section 7 to the tire valve 9 of an appropriate wheel tire 8.

[Step S4]

Upon receiving the digital signal for the specified value, the control unit 19 has the display window 12 of the display unit 13 digitally display the specified value.

[Step S5]

The control unit 19 also writes the specified value in the RAM 24.

[Step S6]

As the operator specifies a pneumatic pressure value for the front wheel tires 8 by depressing one or more than one selected value specifying buttons 10, a digital signal representing the specified value is transmitted to the control unit 19.

[Step S7]

Upon receiving the digital signal for the front wheel tires, the control unit 19 has the display window 12 of the display unit 13 digitally display the value specified for the front wheel tires.

[Step S8]

The control unit 19 also writes the, value specified for the front wheel tires in the RAM 24.

[Step S9]

As the operator specifies a pneumatic pressure value for the rear wheel tires 8 by depressing one or more than one selected value specifying buttons 10, a digital signal representing the specified value is transmitted to the control unit 19. After entering the pneumatic pressure value, the operator connects the tire valve connecting section 7 to the tire valve 9 of one of the rear wheel tires 8.

[Step S10]

Upon receiving the digital signal for the rear wheel tires, the control unit 19 has the display window 12 of the display unit 13 digitally display the value specified for the rear wheel tires.

[Step S11]

The control unit 19 also writes the value specified for the rear wheel tires in the RAM 24.

[Step S12]

Then, the control unit 19 transmits a signal specifying a tire (a front wheel tire or a rear wheel tire) 8 and a corresponding digital signal representing the specified pneumatic pressure value for the tire to the display unit 13, which by turn displays the specified pneumatic pressure value. The specified tire needs to be the first one in the sequence defined in [Step S1].

[Step S13]

Thereafter, the control unit 19 determines if the specified pneumatic pressure is equal to the atmospheric pressure or not and the operation proceeds to [Step S14] if the answer to this question is positive, whereas it proceeds to [Step S15] if the answer is negative.

[Step S14]

The control unit 19 determines if the time defined in [Step S1] has passed under the atmospheric pressure. If the answer to this question is positive, the control unit 19 terminates the operation of regulating the pneumatic pressure of the tire. If not, it returns to [Step S13] and follows a loop linking [Step S13] and [Step S14] until the answer becomes positive.

[Step S15]

In this step, the control unit 19 measures the stand-by time required for the signal from the pressure sensor 15 to become stabilized. This is a step of operation provided to cancel any measurement of the pneumatic pressure of the selected tire until the pressure comes to show a steady value in view of the fact that the pneumatic pressure of a tire may fluctuate immediately after it is raised in [Step S21] or reduced in [Step S22] as will be described hereinafter.

[Step S16]

Upon receiving a signal representing a measured pneumatic pressure of the tire 8 from the pressure sensor 15, the control unit 19 performs an arithmetic operation to calculate the actual pneumatic pressure of the tire 8.

[Step S17]

Then, the control unit 19 determines the pressure difference $\Delta P$ between the measured value $P_m$ and the specified value $P_{pr}$ for the pneumatic pressure of the tire 8, using the equation below.

$$\Delta P = P_m - P_{pr}$$

[Step S18]

The control unit 19 transmits a digital signal representing the result of the above calculation, or $\Delta P$, to the display unit 13 and has it display the digital value of $\Delta P$ and the specified pneumatic pressure value. More specifically, the control unit 19 has the digital display members 12a and 12b respectively display the specified pneumatic pressure and the pressure difference $\Delta P$.

[Step S19]

The control unit 19 determines the category to which the pressure difference $\Delta P$ belongs. In other words, if the pressure difference $\Delta P$ is found within the allowance E as defined in [Step S1], it regards $\Delta P$ to be equal to zero, or $\Delta P = 0$ and the operation proceeds to [Step S20]. If, on the other hand, $\Delta P$ is not found within E and $\Delta P < 0$, then the operation proceeds to [Step S21] where the control unit 19 performs a processing for raising the pressure of the tire 8. Finally, if $\Delta P$ is not found within the allowance and $\Delta P > 0$, the operation goes to [Step S22] where the control unit 19 performs a processing for reducing the pressure of the tire 8.

[Step S20]

The control unit 19 transmits a drive signal to the buzzer 22 to have the latter sound to inform the operator that the operation of regulating the pneumatic pressure of the tire is now over. Then, the control unit 19 returns to [Step S12].

[Step S21]

In this step, the control unit 19 carries out a processing for raising the pressure of the tire 8 following the flow chart of FIGS. 6A and 6B (which will be described hereinafter) and then returns to [Step S13].

[Step S22]

The control unit 19 carries out a processing for reducing the pressure of the tire 8 following the flow chart of FIGS. 7A and 7B (which will be described hereinafter) and then returns to [Step S13].

Now, a processing for raising the pneumatic pressure of a tire 8 to be carried out by following the flow chart of FIGS. 6A and 6B will be described by referring to FIGS. 6A, 6B and 8 that illustrates the relationship between the pneumatic pressure of a tire 8 and the time consumed for the operation of regulating the pressure of the tire 8.

[Step S21-1]

The control unit 19 determines if the processing for raising the pneumatic pressure is to be carried out for the first time in the current operation or not. If the answer to this question is positive, then the operation proceeds to [Step S21-2]. Otherwise, the operation goes to [Step S21-14].

[Step S21-2]

In this step, the control unit 19 reads the extent of openness of the air charging valve $F_{OA}$ and the time for keeping the air charging valve open $F_{OT}$ corresponding to the pressure difference $\Delta P$ and stored in advance in the ROM 25. The relationship between $\Delta P$ and the extent of openness of the air charging valve 17 and the relationship between $\Delta P$ and the time for keeping the air charging valve open as stored in the ROM 25 will be typically like the graphs respectively illustrated in FIGS. 10 and 11. If summarily stated, the greater the absolute value of $\Delta P$, the greater the extent of openness of the air charging valve and the time for keeping the air charging valve open. Conversely, the smaller the absolute value of $\Delta P$, the smaller the extent of openness of the air charging valve and the time for keeping the air charging valve open. Each of the extent of openness of the air charging valve and the time for keeping the air charging valve open is linearly proportional to $\Delta P$.

[Step S21-3]

The control unit 19 transmits a control signal representing the extent of openness of the air charging valve $F_{OA}$ it has read from the ROM 25 to the valve drive section 20, which transmits a drive signal for controlling the openness of the air charging valve to the air charging valve 17 in response to the control signal so that the extent of openness of the air charging valve 17 correctly corresponds to the pressure difference ΔP.

[Step S21-4]

The control unit 19 measures the time of keeping the air charging valve 17 $F_{OT}$ open as a function of the pressure difference ΔP.

[Step S21-5]

When the specified time of keeping the air charging valve 17 $F_{OT}$ has passed, the control unit 19 controls the valve drive section 20 so as to shut the air charging valve 17. The tire 8 has been charged with air coming from the pneumatic pressure source 2 at an rate and to an extent as indicated by line A in FIG. 8.

[Step S21-6]

Then, the control unit 19 measures the stand-by time required of it until a steady value is measured for the signal representing the pneumatic pressure measured by the pressure sensor 15. This is a step of operation provided to cancel any measurement of the pneumatic pressure of the selected tire until the pressure comes to show a steady value in view of the fact that the pneumatic pressure of a tire may fluctuate immediately after it is raised. (This stand-by time corresponds to line B in FIG. 8.)

[Step S21-7]

Upon receiving the signal from the pressure sensor 15 representing the measured pneumatic pressure of the tire 8, it calculates the actual pneumatic pressure value of the tire 8.

[Step S21-8]

In this step, the control unit 19 determines if the measured pneumatic pressure value obtained this time is greater than the corresponding value obtained last time. If the answer to this question is positive, it decides that the operation of regulating the pneumatic pressure of the tire is proceeding properly and the operation proceeds to [Step S21-9]. If the answer is negative, it decides that there is something wrong with the operation and jumps to [Step S21-12].

[Step S21-9]

The control unit 19 calculates the rate of pressure change a(FOA) when the extent of openness of the air charging valve is $F_{OA}$ and also the difference between the pneumatic pressure measured this time and the specified pneumatic pressure value, or ΔP, using the following formulas.

a(FOA) = (Value measured this time −

Value measured last time)/time of keeping the valve open $F_{OT}$

ΔP = Value measured this time − Specified value

[Step S21-10]

Then, the control unit 19 writes the rate of pressure change a(FOA) and the extent of openness of the valve $F_{OA}$ obtained by the above calculations in the RAM 24.

[Step S21-11]

The control unit 19 determines the category to which the pressure difference ΔP belongs. In other words, if the pressure difference ΔP is found within the allowance E as defined in [Step S1], it regards ΔP to be equal to zero, or ΔP=0 and terminate the operation of raising the pneumatic pressure of the tire 8. If, on the other hand, ΔP is not found within E and ΔP<0, then the operation returns to [Step S21-1].

[Step S21-12]

As the control unit 19 regards that there is something wrong with the operation of charging the tire with air, it transmits an error signal to the display unit 13 and digital display members 12a and 12b display, for example, ERROR.

[Step S21-13]

In this step, the operator confirms that an error has occurred in the operation of charging the tire with air.

[Step S21-14]

If it is determined in the above [Step S21-1] that the processing for raising the pneumatic pressure to be carried out is not the first one in the current operation, the control unit 19 reads from the RAM 24 the rate of pressure change a(FOA) and the extent of openness of the valve $F_{OA}$ written in the RAM 24 in [Step S21-10].

[Step S21-15]

The control unit 19 then calculates the time for keeping the valve open $F_T$ from the rate of pressure change a(FOA) and the pressure difference ΔP, using the formula below.

$$F_T = \Delta P / a(FOA)$$

[Step S21-16]

The control unit 19 transmits a control signal representing the extent of openness of the air charging valve $F_{OA}$ it has read from the RAM 24 to the valve drive section 20, which transmits a drive signal for controlling the openness of the air charging valve to the air charging valve 17 in response to the control signal so that the air charging valve 17 shows an extent of openness of the air charging valve 17 $F_{OA}$ same as that of the last processing.

[Step S21-17]

The control unit 19 measures the time of keeping the air charging valve 17 open until the latter becomes equal to the time for keeping the air charging valve 17 $F_T$ as calculated in [Step S21-15].

Figure 8:
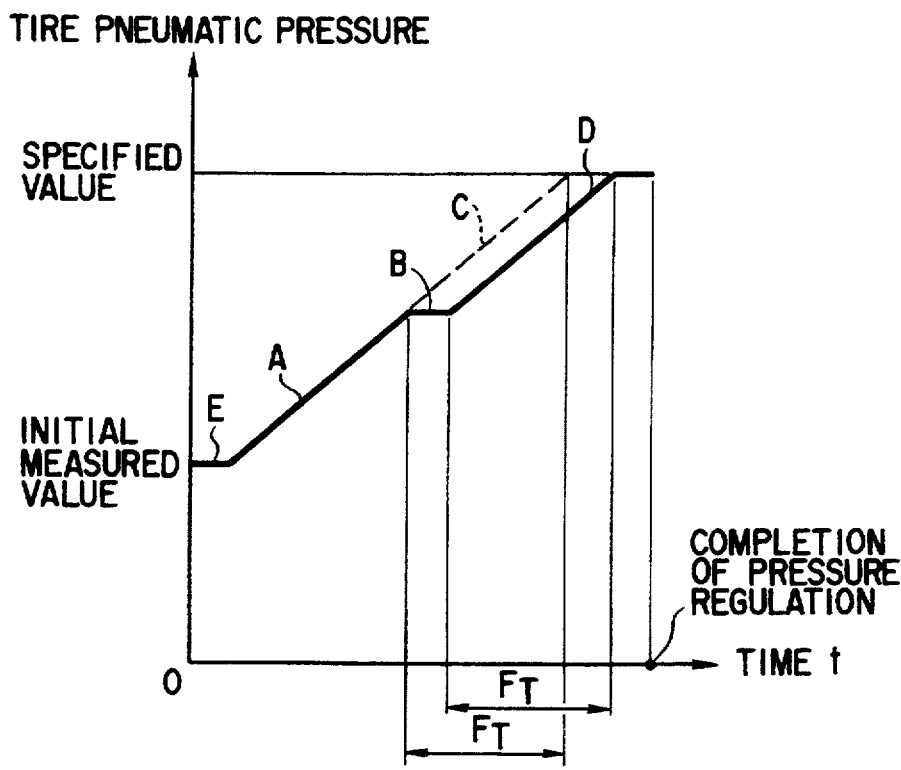
FIG. 8 is a graph showing the relationship between the elapsed time and the pneumatic pressure of a motor vehicle tire in a pneumatic pressure raising operation of the first embodiment.

The above processing steps correspond to line D in FIG. 8, where line D is obtained by firstly drawing line C having a gradient (rate of pressure change) equal to line A until the specified pneumatic pressure value is reached and then shifting line C to the right by an amount corresponding to the length of line B representing the stand-by time before a steady value is measured for the pneumatic pressure of the tire. Line E in FIG. 8 corresponds to the stand-by time required for the signal from the pressure sensor 15 to become stabilized in the initial measurement in [Step S15].

Now, a processing for reducing the pneumatic pressure of a tire 8 to be carried out in [Step S22] by following the flow chart of FIGS. 7A and 7B will be described by referring to FIGS. 7A, 7B.

[Step S22-1]

The control unit 19 determines if the processing for reducing the pneumatic pressure is to be carried out for the first time in the current operation or not. If the answer to this question is positive then the operation proceeds to [Step S22-2]. Otherwise, the operation goes to [Step S22-14].

[Step S22-2]

In this step, the control unit 19 reads the extent of openness of the air discharging valve $R_{OA}$ and the time for keeping the air discharging valve open $R_{OT}$ corresponding to the pressure difference ΔP and stored in advance in the ROM 25. The relationship between ΔP and the extent of openness of the air discharging valve 18 and the relationship between ΔP and the time for keeping the air discharging valve open as stored in the ROM 25 will be typically like the graphs respectively illustrated in FIGS. 10 and 11 as in the case of an processing for raising the tire pressure. If summarily stated, the greater the absolute value of $\Delta P$, the greater the extent of openness of the air discharging valve and the time for keeping the air discharging valve open. Conversely, the smaller the absolute value of $\Delta P$, the smaller the extent of openness of the air discharging valve and the time for keeping the air discharging valve open. Each of the extent of openness of the air discharging valve and the time for keeping the air discharging valve open is linearly proportional to $\Delta P$.

[Step S22-3]

The control unit 19 transmits a control signal representing the extent of openness of the air discharging valve $R_{OA}$ it has read from the ROM 25 to the valve drive section 20, which transmits a drive signal for controlling the openness of the air discharging valve to the air discharging valve 18 in response to the control signal so that extent of openness of the air discharging valve 18 correctly corresponds to the pressure difference $\Delta P$.

[Step S22-4]

The control unit 19 moniters the time of keeping the air discharging valve 18 $R_{OT}$ open as a function of the pressure difference $\Delta P$.

[Step S22-5]

When the specified time of keeping the air discharging valve 18 $R_{OT}$ open has passed, the control unit 19 controls the valve drive section 20 so as to shut the air discharging valve 18. The air in the tire 8 has been partly discharged into the atmosphere.

[Step S22-6]

Then, the control unit 19 measures the stand by time required of it until a steady value is measured for the signal representing the pneumatic pressure measured by the pressure sensor 15. This is a step of operation provided to cancel any measurement of the pneumatic pressure of the selected tire until the pressure comes to show a steady value in view of the fact that the pneumatic pressure of a tire may fluctuate immediately after it is reduced.

[Step S22-7]

Upon receiving the signal from the pressure sensor 15 representing the measured pneumatic pressure of the tire 8, it calculates the actual pneumatic pressure value of the tire 8.

[Step S22-8]

In this step, the control unit 19 determined if the measured pneumatic pressure value obtained this time is smaller than the corresponding value obtained last time. If the answer to this question is positive, it decides that the operation of regulating the pneumatic pressure of the tire is proceeding properly and the operation proceeds to [Step S22-9]. If the answer is negative, it decides that there is something wrong with the operation and jumps to [Step S22-12].

[Step S22-9]

The control unit 19 calculates the rate of pressure change a(ROA) when the extent of openness of the air discharging valve is $R_{OA}$ and also the difference between the pneumatic pressure measured this time and the specified pneumatic pressure value, or $\Delta P$, using the following formulas.

$a(ROA) = $ (Value measured this time −

Value measured last time)/time of keeping the valve open $R_{OT}$ $\Delta P = $ Value measured this time − Specified value

[Step S22-10]

Then, the control unit 19 writes the rate of pressure change a(ROA) and the extent of openness of the valve $R_{OA}$ obtained by the above calculations in the RAM 24.

[Step S22-11]

The control unit 19 determines the category to which the pressure difference $\Delta P$ belongs. In other words, if the pressure difference $\Delta P$ is found within the allowance E as defined in [Step S1], it regards $\Delta P$ to be equal to zero, or $\Delta P = 0$ and terminate the operation of reducing the pneumatic pressure of the tire 8. If, on the other hand, $\Delta P$ is not found within E and $\Delta P > 0$, then the operation returns to [Step S22-1].

[Step S22-12]

As the control unit 19 regards that there is something wrong with the operation of discharging the tire with air, it transmits an error signal to the display unit 13 and digital display members 12a and 12b display, for example, ERROR.

[Step S22-13]

In this step, the operator confirms that an error has occurred in the operation of discharging air from the tire.

[Step S22-14]

If it is determined in the above [Step S22-1] that the processing for reducing the pneumatic pressure to be carried out is not the first one in the current operation, the control unit 19 reads from the RAM 24 the rate of pressure change a(ROA) and the extent of openness of the valve $R_{OA}$ written in the RAM 24 in [Step S22-10].

[Step S22-15]

The control unit 19 then calculates the time for keeping the valve open $R_T$ from the rate of pressure change a(ROA) and the pressure difference $\Delta P$, using the formula below.

$R_T = \Delta P / a(ROA)$

[Step S22-16]

The control unit 19 transmits a control signal representing the extent of openness of the air discharging valve $R_{OA}$ it has read from the RAM 24 to the valve drive section 20, which transmits a drive signal for controlling the openness of the air discharging valve to the air discharging valve 18 in response to the control signal so that the air discharging valve 18 shows an extent of openness of the air discharging valve 18 $R_{OA}$ same as that of the last processing.

[Step S22-17]

The control unit 19 measures the time of keeping the air discharging valve 18 open until the latter becomes equal to the time for keeping the air discharging valve 18 $R_T$ as calculated in [Step S22-15].

The above processing steps carried out by the control unit 19 following the flow charts of FIGS. 4 through 7B may be summarized as follows.

As a specified pneumatic pressure value is given to it by way of the specified value input section 11, it causes the pressure sensor 15 to actually measure the pneumatic pressure of a specific tire and then calculates the pressure difference between the actual pneumatic pressure of the tire measured by the pressure sensor 15 and the specified pneumatic pressure. It then charges the tire with air or discharges air from the tire, controlling the extent of openness of the air charging valve 17 or the air discharging valve 18 and the time for keeping the air charging valve 17 or the air discharging valve 18 open, whichever appropriate, by sending a control signal to the valve control section 20 as a function of the calculated pressure difference. Thereafter, the control unit 19 calculates the rate of pressure change from the actual pneumatic pressure value measured for the second time as well as the pressure difference between said actual pneumatic pressure value measured for the second time and the specified pneumatic pressure.

It then charges the tire with air or discharges air from the tire by sending another control signal to the valve control section 20 as a function of the newly obtained pressure difference. During the charging or discharging operation, the time for keeping the air charging valve 17 or air discharging valve 18 is open is varied, but the extent of openness of valve 17 or 18 is maintained at the initial value.

In short, the operation of charging a tire 8 with air or discharging a tire 8 of air is carried out by calculating the actual rate of pressure change in the tire 8 (that may vary from tire to tire) and using it to determine the time for keeping the valve open for the next time. With such an arrangement, it may be obvious that the number of times with which the air charging valve or the air discharging valve is operated and, therefore, the entire time required to complete the operation of regulating the pneumatic pressure of all the tires will be significantly reduced.

Figure 9:
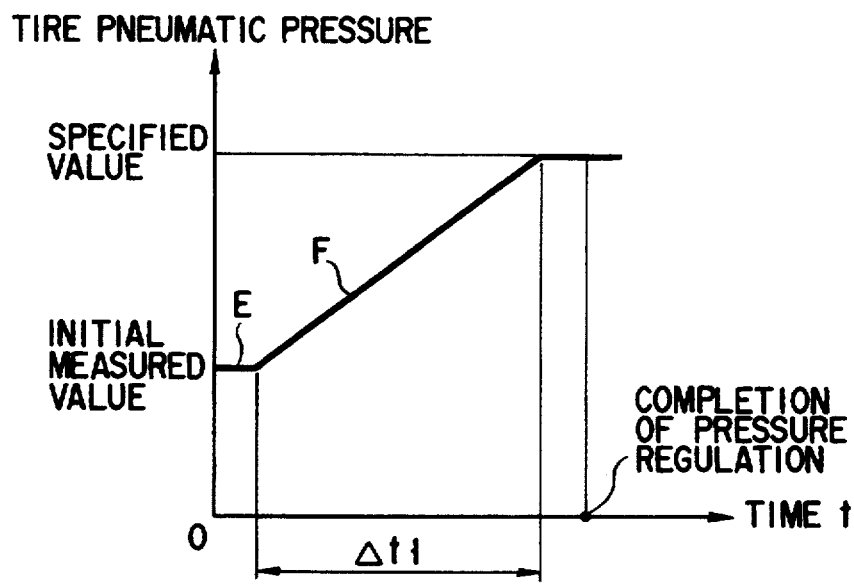
FIG. 9 is a graph similar to that of FIG. 8 but showing the relationship between the elapsed time and the pneumatic pressure of a motor vehicle tire in a pneumatic pressure raising operation of the first embodiment when the tire is of a type same as the type of the tire of FIG. 8.

If the tire 8 whose pneumatic pressure has been regulated (hereinafter referred to as the preceding tire) is of a type same as that of the tire 8 to be regulated thereafter for pneumatic pressure (hereinafter referred to as the succeeding tire), the control unit 19 goes to [Step S12] after completing the operation of regulating the pneumatic pressure of the preceding tire 8 and starts with [Step S21-14] for the pressure raising processing in [Step S21] or [Step S22-14] for the pressure reducing processing in [Step S22], whichever appropriate. Then, while the control unit 19 calculates the pressure difference between the specified pneumatic pressure value given to it by way of the specified value input section 11 and the actual pneumatic pressure level measured by the pressure sensor 15 each time the actual pneumatic pressure is measured since the second time of measurement, the extent of openness of the air charging valve 17 or the air discharging valve 18, whichever appropriate, may always be held to the initial value so that only the time for keeping the valve open $\Delta t1$ needs to be calculated each time from pressure difference $\Delta P$ and the rate of pressure change (the gradient of line F in FIG. 9) obtained for the preceding tire 8 as illustrated in FIG. 9.

In other words, the actual rate of pressure change obtained for the preceding tire 8 during the operation of charging it with air or discharging air from it is utilized to determine the time for keeping the air charging or discharging valve open for the succeeding tire 8. With such an arrangement, then, the number of times with which the air charging valve or the air discharging valve is operated and, therefore, the entire time required to complete the operation of regulating the pneumatic pressure of all the tires will be reduced further.

As the operator of the above described first embodiment is exempted from any manual work for regulating the pneumatic pressure of each of the tires and he or she only has to enter one or two specified pneumatic pressure values into the apparatus by way of the specified value input section 11, the efficiency with which the entire operation of regulating the tires of a motor vehicle proceeds will be enormously improved.

Additionally, here to the fact that the pneumatic pressure regulating unit 5 is arranged in the proximity of the tire valve connecting section 7, the operator is not required to move around on the floor to perform the assignment. Thus the operator can easily carry out the work of regulating the pneumatic pressure of the tires of a motor vehicle including entering, if any, newly specified pneumatic pressure values into the apparatus.

Since the pneumatic pressure value specified for the current operation of regulating the pneumatic pressure of the tires of a motor vehicle is displayed on the display unit 13, the operator can visually confirm the specified value to avoid any error in specifying a pneumatic pressure value. Still additionally, since the pressure difference $\Delta P$ between the specified pneumatic pressure and the actual pneumatic pressure measured by the pressure sensor 15 is displayed on the digital display member 12b along with the specified pneumatic pressure each time the pneumatic pressure is measured, the operator will never fail to recognize that there is a pressure difference, if any, and the operation of regulating the pneumatic pressure of the tires of a motor vehicle is still going on.

Since the buzzer 22 of the embodiment is so designed that it sounds whenever the operation of regulating the pneumatic pressure of the tires of a motor vehicle is completed, the operator can easily recognize the end of a pneumatic pressure regulating operation.

While the tire valve connecting section 7 of the above first embodiment is constantly held open, it may alternatively be kept closed.

It may be needless to say that the relationship between the pressure difference $\Delta P$ and the extent of openness of the air charging or discharging valve and the relationship between $\Delta P$ and the time for keeping the valve open may not necessarily be restricted to those of the above embodiment and they may be appropriately modified. For instance, the relationships as illustrated in FIGS. 29 and 30 through 34 may take place when simply structured valves that can only be opened or closed (ON-OFF valves) are used for the air charging and discharging valves. The mode of operation for controlling these ON-OFF valves in an apparatus according to the invention will be described hereinafter.

Now, a second embodiment of the invention will be described by referring to FIGS. 13 through 19J. This embodiment differs from the first embodiment only in that the display window 12 comprises a digital display member 12a for displaying a specified pneumatic pressure value and a plurality of light emitting elements (LEDs) 12c arranged below the display member 12a in FIG. 13.

The light emitting elements 12c may be utilized in such a manner that the pressure difference $\Delta P$ between the specified pneumatic pressure value and the actual pneumatic pressure value measured by the pressure sensor 15 is indicated by the number of LEDs. One LED may be activated as illustrated in FIG. 14 or, numbers of LEDs may be activated as illustrated in FIG. 15.

In this second embodiment, the LEDs flash to inform the operator of the fact that the apparatus is carrying out a pressure raising or reducing operation.

Now, the operation of the control unit 19 of the second embodiment will be described only for the portions that are different from those of the first embodiment.

Figure 6A:
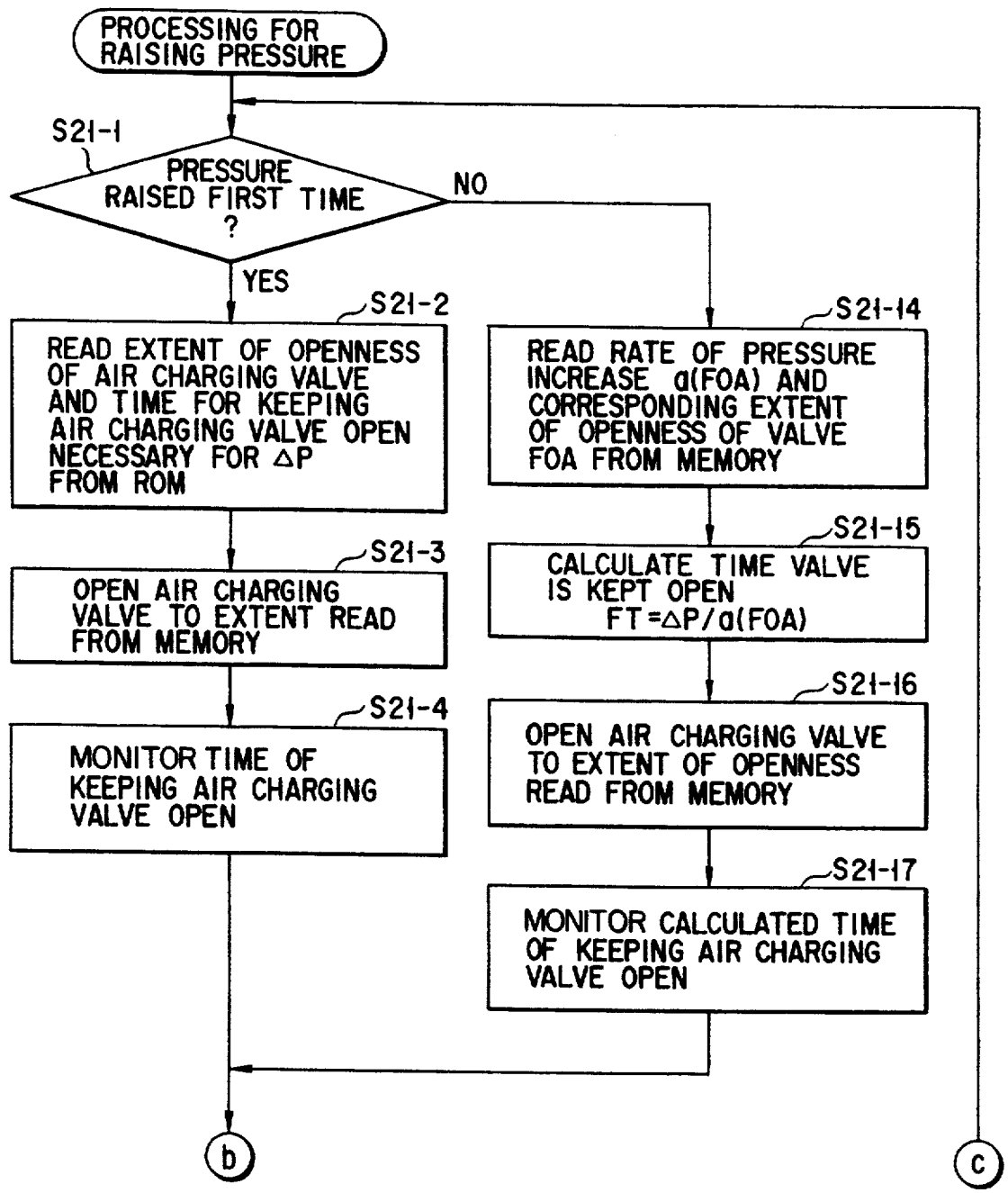
FIG. 6A is a portion of a flow chart illustrating a pneumatic pressure raising operation of the first embodiment.

FIG. 16A is a portion of a flow chart for a pressure raising processing corresponding to that of FIG. 6A for the first embodiment. Note that [Step S21-4], [Step 21-17] in FIG. 6A is modified to become [Step S21-4a], [Step 21-17a] in FIG. 16A, respectively.

[Step S21-4a]

The control unit 19 measures the time of keeping the air charging valve 17 $F_{OT}$ open as a function of the pressure difference ΔP.

Additionally, it flashes the light emitting elements 12c in the + direction. While FIGS. 18A through 18E illustrates light emitting elements 12c flashing in the − direction, they flash in the opposite direction or in the + direction in this step.

[Step S21-17a]

The control unit 19 measures the time of keeping the air charging valve 17 open until the latter becomes equal to the time for keeping the air charging valve 17 $F_T$ as calculated in [Step S21-15].

Additionally, it flashed the light emitting elements 12c in the + direction.

Figure 6B:
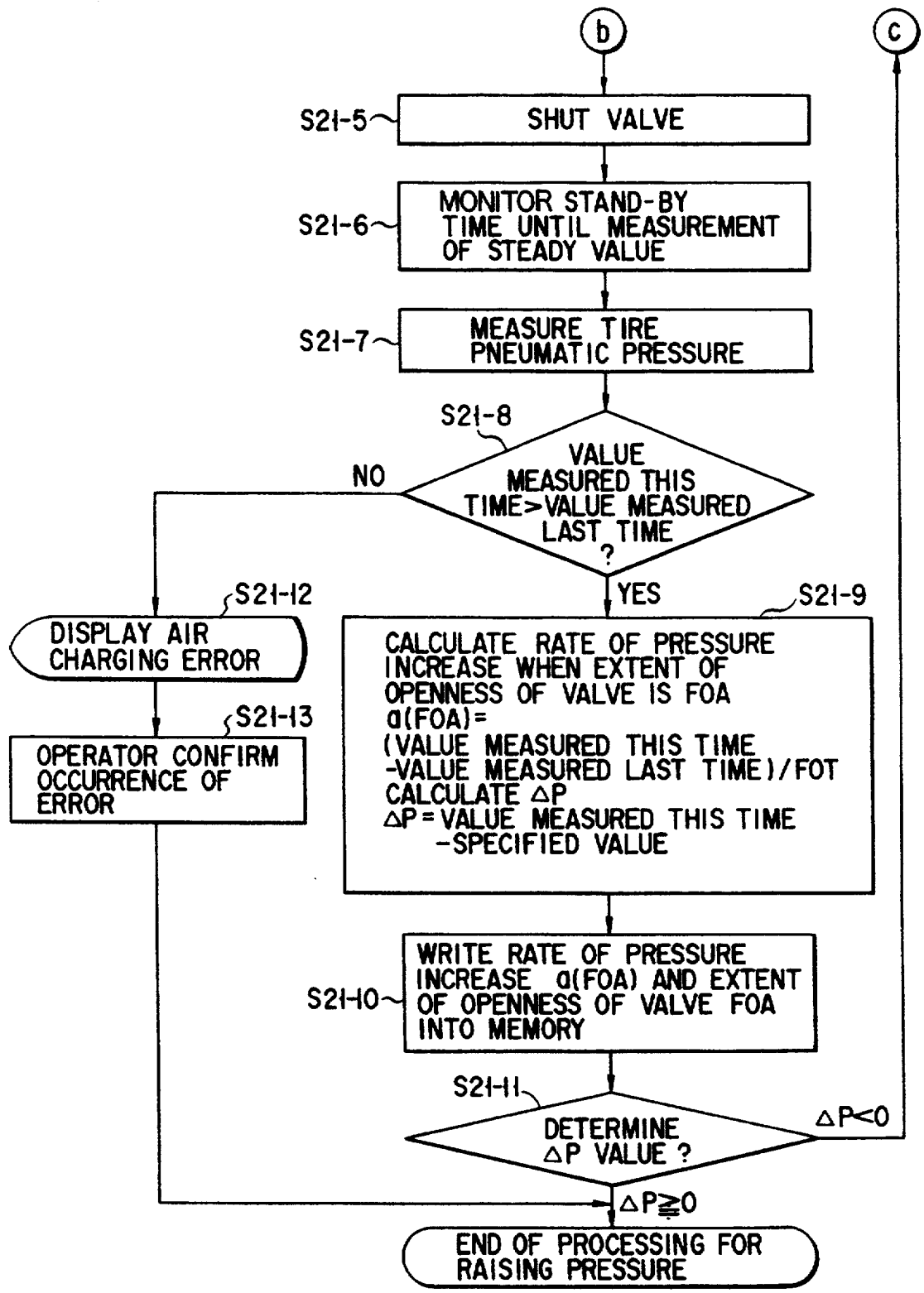
FIG. 6B is the remaining portion of the flow chart of FIG. 6A illustrating a pneumatic pressure raising operation of the first embodiment.
Figure 16B:
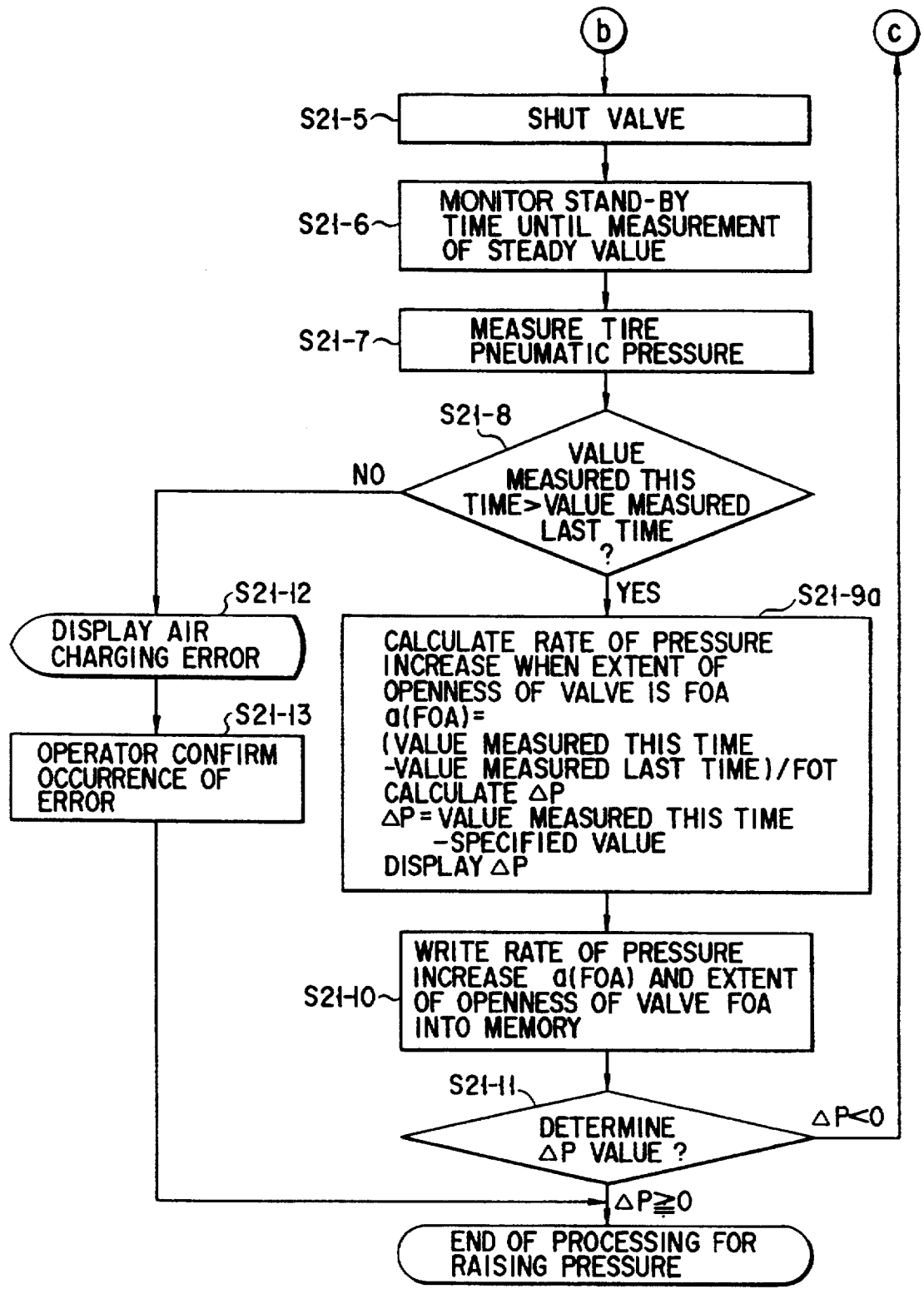
FIG. 16B is the remaining portion of the flow chart of FIG. 16A illustrating a pneumatic pressure raising operation of the second embodiment.

FIG. 16B is the remaining portion of the flow chart for a pressure raising processing corresponding to that of FIG. 6B for the first embodiment. Note that [Step S21-9] in FIG. 6B is modified to become [Step S21-9a] in FIG. 16B.

[Step S21-9a]

The control unit 19 calculates the rate of pressure change a(FOA) when the extent of openness of the air charging valve is $F_{OA}$ and also the difference between the pneumatic pressure measured this time and the specified pneumatic pressure value, or ΔP, using the following formulas.

a(FOA) = (Value measured this time −

Value measured last time)/time of keeping the valve open $F_{OT}$

ΔP = Value measured this time − Specified value

Then, the control unit 19 has the light emitting elements 12c flash to indicate the value of ΔP in a manner as illustrated in FIG. 14 or FIG. 15.

Figure 17A:
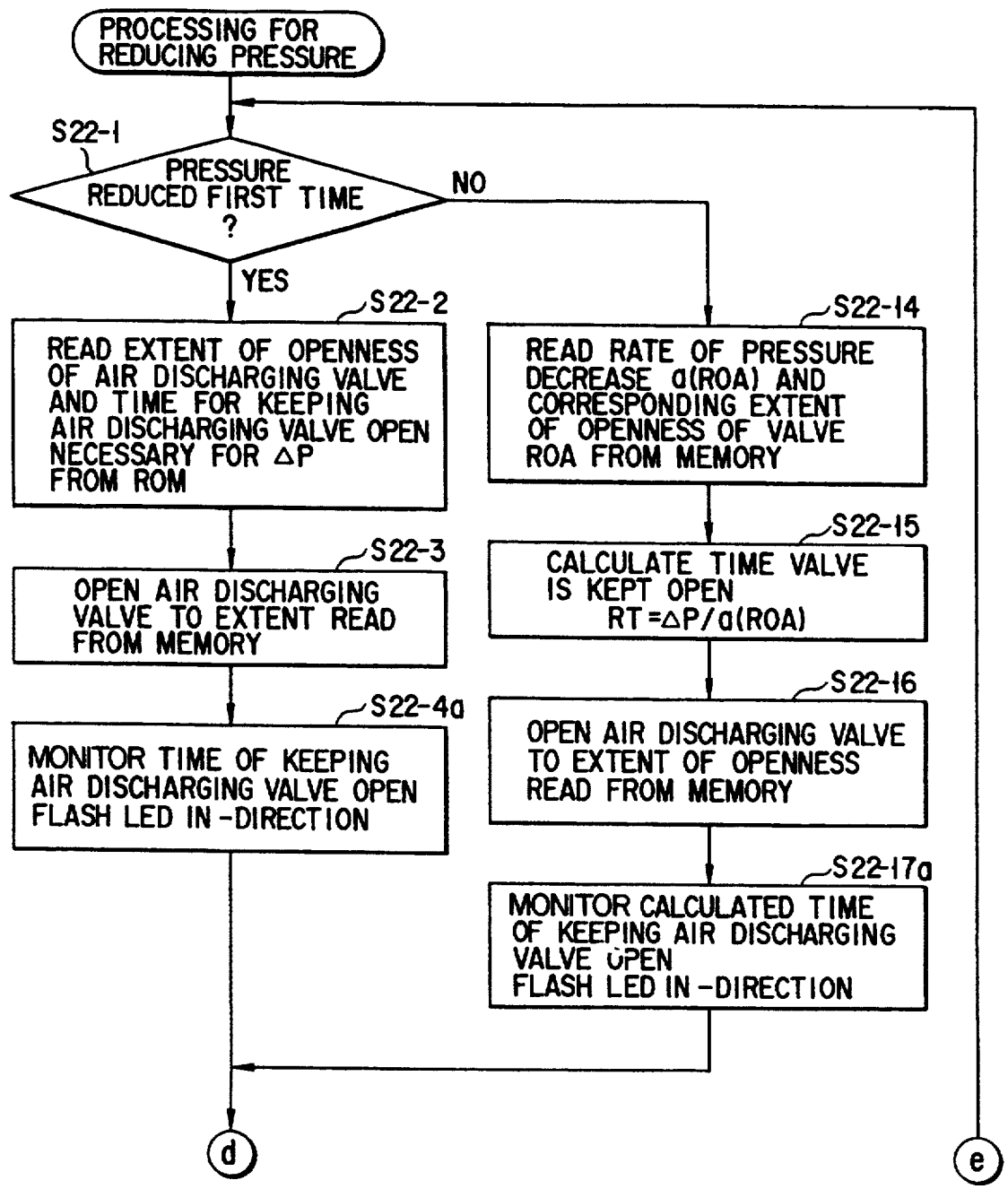
FIG. 17A is a portion of a flow chart illustrating a pneumatic pressure reducing operation of the second embodiment.

FIG. 17A is a portion of a flow chart for a pressure reducing processing corresponding to that of FIG. 7A for the first embodiment. Note that [Step S22-4], [Step S22-17] in FIG. 7A is modified to become [Step S22-4a], [Step S22-17a] in FIG. 17A, respectively.

[Step S22-4a]

The control unit 19 measures the time of keeping the air discharging valve 18 $R_{OT}$ open as a function of the pressure difference ΔP.

Additionally, it flashes the light emitting elements 12c in the − direction. FIGS. 18A through 18E illustrates light emitting elements 12c flashing in the − direction.

[Step S22-17a]

The control unit 19 measures the time of keeping the air discharging valve 18 open until the latter becomes equal to the time for keeping the air discharging valve 18 $R_T$ calculated in [Step S22-15].

Additionally, it flashed the light emitting elements 12c in the − direction.

Figure 7B:
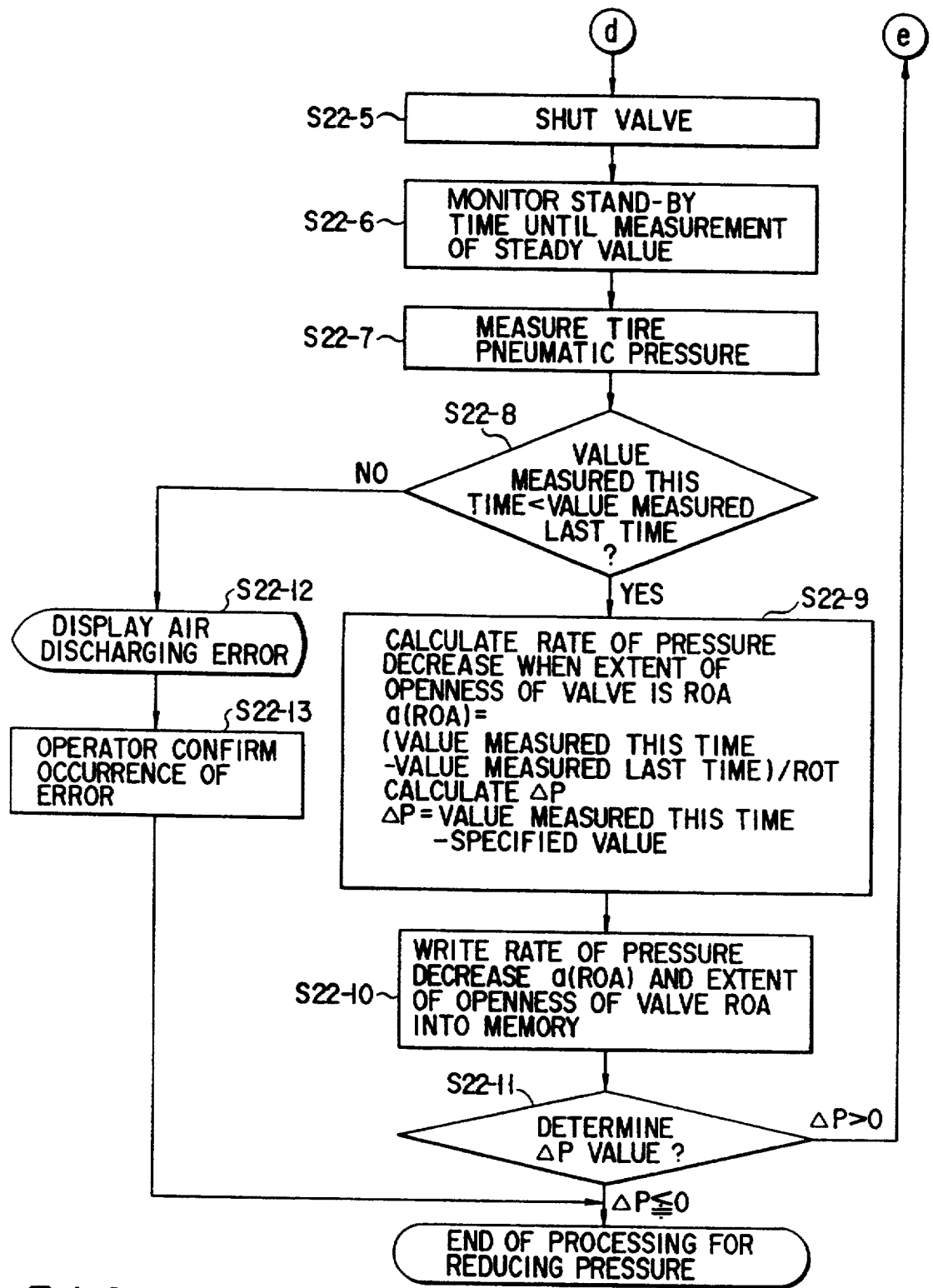
FIG. 7B is the remaining portion of the flow chart of FIG. 7A illustrating a pneumatic pressure reducing operation of the first embodiment.
Figure 17B:
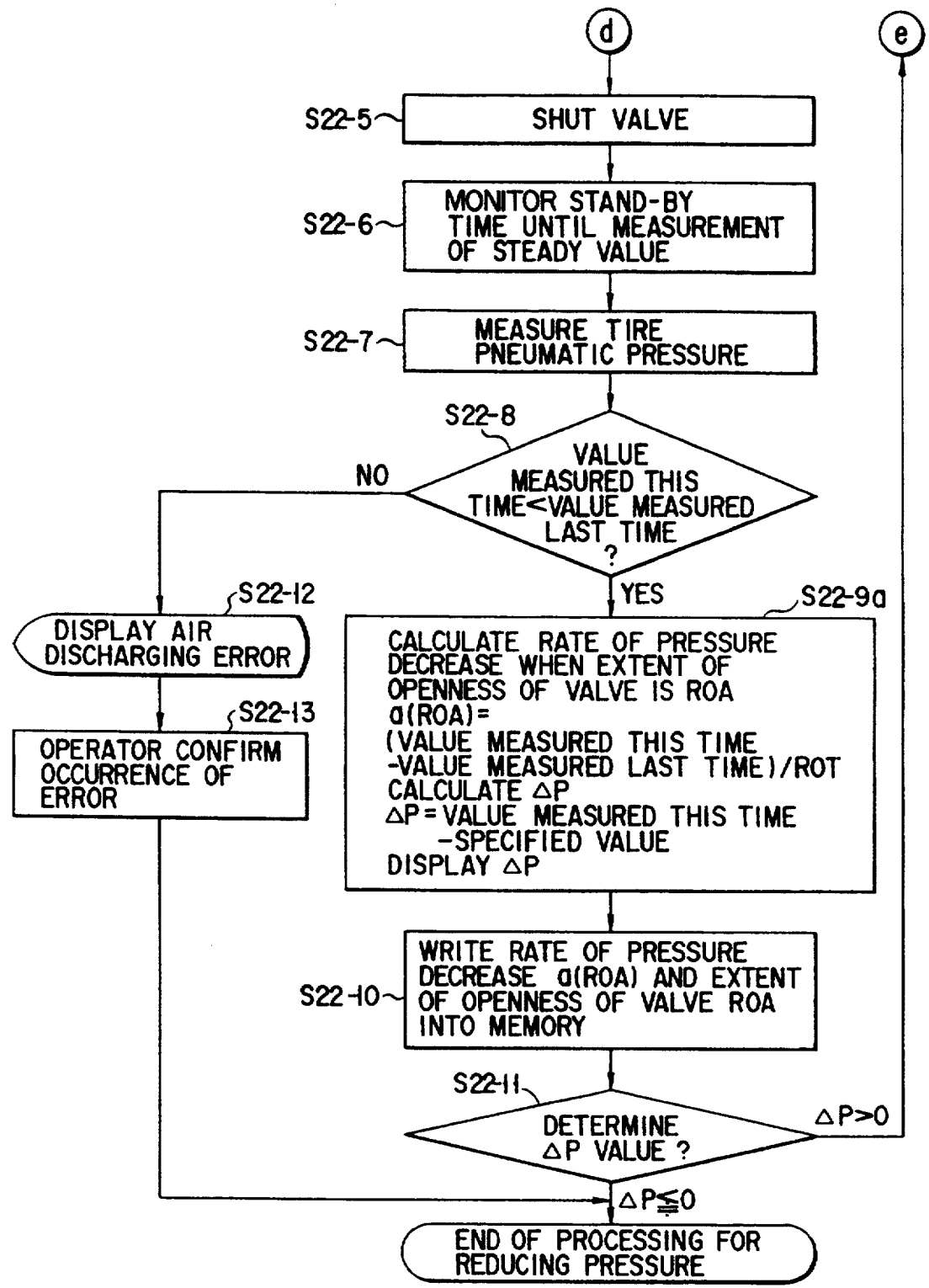
FIG. 17B is the remaining portion of the flow chart of FIG. 17A illustrating a pneumatic pressure reducing operation of the second embodiment.
Figure 19A:
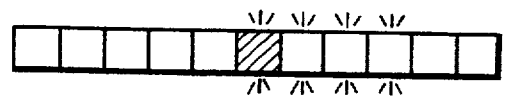
FIGS. 19A through 19J are schematic illustrations showing different aspects of another exemplary operation of the light emitting elements of the second embodiment.
Figure 19B:
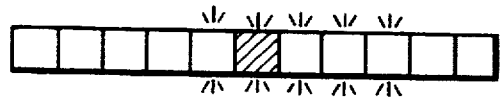
Figure 19C:
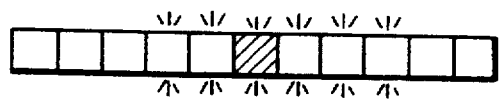
Figure 19D:
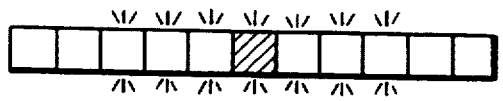
Figure 19E:
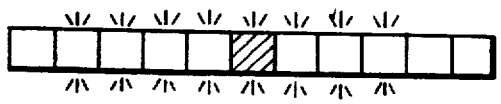
Figure 19F:
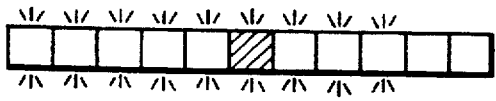
Figure 19G:
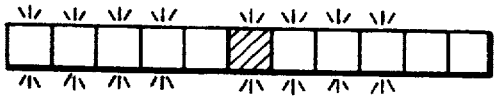
Figure 19H:
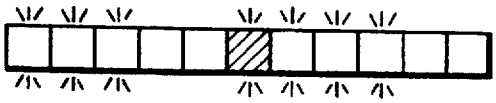
Figure 19I:
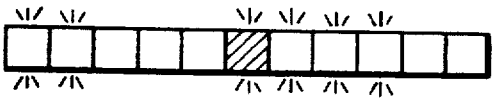
Figure 19J:
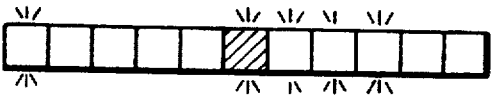

FIG. 17B is the remaining portion of the flow chart for a pressure reducing processing corresponding to that of FIG. 7B for the first embodiment. Note that [Step S22-9] in FIG. 7B is modified to become [Step S22-9a] in FIG. 17B.

[Step S22-9a]

The control unit 19 calculates the rate of pressure change a(ROA) when the extent of openness of the air discharging valve is $R_{OA}$ and also the difference between the pneumatic pressure measured this time and the specified pneumatic pressure value, or ΔP, using the following formulas.

a(ROA) = (Value measured this time −

Value measured last time)/time of keeping the valve open $R_{OT}$

ΔP = Value measured this time − Specified value

Then, the control unit 19 has the light emitting elements 12c flash to indicate the value of ΔP in a manner as illustrated in FIG. 14 or FIG. 15.

The way of flashing the light emitting elements 12c while calculating the time for keeping the valve open may be modified to appear as those in FIGS. 19A through 19J.

Now, a third embodiment of the invention will be described by referring to FIGS. 20 through 28. This embodiment differs from the first embodiment only in that the processing operation of the control unit 19 of the first embodiment as illustrated in the flow charts of FIGS. 4 through 7B are replaced by those of FIGS. 20 through 23.

In the following description, it is assumed that the apparatus 1 for regulating the pneumatic pressure of a tire is already connected to a pneumatic pressure source 2 and the power switch is already on.

[Step S31]

Before starting an operation of regulating the pneumatic pressure of a tire 8, the operator specifies a mode of operation, using appropriate ones of the value specifying buttons 10 of the specified value input section 11, in order to define some of the basic parameters for the operation, including the unit of pneumatic pressure, the time expressed in minutes that needs to pass under the atmospheric pressure before determining the end of operation in [Step S36] as described hereinafter and allowance E for determining the pressure difference ΔP which will also be described hereinafter. These parameters are stored in the memory even after the power switch is turned off so that the same parameters are selected when the switch is turned on next time.

[Step S32]

As the operator enters a pneumatic pressure value for a wheel tire 8, using one or more than one of the value specifying buttons 10, the specified value input section 11 transmits a digital signal representing the specified pneumatic pressure value to the control unit 19. After entering the pneumatic pressure value, the operator connects the tire valve connecting section 7 to the tire valve 9 of the wheel tire 8. If the pneumatic pressure of a tire to be handled after the above tire 8 is different from the above specified value, the operator restarts from this step before connecting the tire valve connecting section 7 to the tire valve 9 of the tire.

[Step S33]

Upon receiving the digital signal for the specified value, the control unit 19 writes the specified value in the RAM 24.

[Step S34]

The control unit 19 also has the digital display member 12a of the digital window 12 of the display unit 13 digitally display the specified value.

[Step S35]

Thereafter, the control unit 19 determines if the specified pneumatic pressure is equal to the atmospheric pressure or not and the operation proceeds to [Step S36] if the answer to this question is positive, whereas it proceeds to [Step S37] if the answer is negative. If the pneumatic pressure of a tire to be handled after the above tire 8 is same as the above specified value, the operator restarts from this step before connecting the tire valve connecting section 7 to the tire valve 9 of the tire.

[Step S36]

The control unit 19 determines if the time defined in [Step S31] has passed under the atmospheric pressure. If the answer to this question positive, the control unit 19 terminates the operation of regulating the pneumatic pressure of the tire. If not, it returns to [Step S35] and follows a loop linking [Step S35] and [Step S36] until the answer becomes positive.

[Step S37]

In this step, the control unit 19 measures the stand-by time required for the signal from the pressure sensor 15 to become stabilized. This is a step of operation provided to cancel any measurement of the pneumatic pressure of the selected tire until the pressure comes to show a steady value in view of the fact that the pneumatic pressure of a tire may fluctuate immediately after it is raised in [Step S33] or reduced in [Step S34] as will be described hereinafter.

[Step S38]

Upon receiving a signal representing a measured pneumatic pressure of the tire 8 from the pressure sensor 15, the control unit 19 performs an arithmetic operation to calculate the actual pneumatic pressure of the tire 8.

[Step S39]

Then, the control unit 19 determines the pressure difference $\Delta P$ between the measured value $P_m$ and the specified value $P_{pr}$ for the pneumatic pressure of the tire 8, using the equation below.

$$\Delta P = P_m - P_{pr}$$

[Step S40]

The control unit 19 transmits a digital signal representing the result of the above calculation, or $\Delta P$, to the display unit 13 and has the digital display member 12b display the digital value of $\Delta P$ and the specified pneumatic pressure value.

[Step S41]

The control unit 19 determines the category to which the pressure difference $\Delta P$ belongs. In other words, if the pressure difference $\Delta P$ is found within the allowance E as defined in [Step S31], it regards $\Delta P$ to be equal to zero, or $\Delta P = 0$ and the operation proceeds to [Step S42]. If, on the other hand, $\Delta P$ is not found within E and $\Delta P < 0$, then the operation proceeds to [Step S43] where the control unit 19 performs a processing for raising the pressure of the tire 8. Finally, if $\Delta P$ is not found within the allowance and $\Delta P > 0$, the operation goes to [Step S44] where the control unit 19 performs a processing for reducing the pressure of the tire 8.

[Step S42]

The control unit 19 transmits a drive signal to the buzzer 22 to have the latter sound.

[Step S43]

In this step, the control unit 19 carries out a processing for raising the pressure of the tire 8 following the flow chart of FIG. 22 (which will be described hereinafter) and then returns to [Step S37].

[Step S44]

The control unit 19 carries out a processing for reducing the pressure of the tire 8 following the flow chart of FIG. 23 (which will be described hereinafter) and then returns to [Step S37].

Now, a processing for raising the pneumatic pressure of a tire 8 to be carried out in [Step S43] by following the flow chart of FIG. 22 will be described.

[Step S43-1]

In this step, the control unit 19 reads the extent of openness of the valve and the time for keeping the valve open stored in the ROM 25 in advance.

[Step S43-2]

The control unit 19 transmits a control signal representing the extent of openness of the valve it has read from the ROM to the valve drive section 20, which transmits a drive signal for controlling the openness of the valve to the air charging valve 17 in response to the control signal so that the extent of openness of the air charging valve 17 correctly corresponds to the pressure difference $\Delta P$.

[Step S43-3]

The control unit 19 measures the time of keeping the valve 17 open as a function of the pressure difference $\Delta P$. [Step S43-4]

When the specified time of keeping the valve 17 open has passed, the control unit 19 controls the valve drive section 20 so as to shut the air charging valve 17. The tire 8 has been charged with air coming from the pneumatic pressure source 2 at a rate corresponding to the specified openness of the valve and for the specified time for keeping the valve open.

Note that the relationship between the pressure difference $\Delta P$ and the extent of openness of the air charging valve 17 and the relationship between $\Delta P$ and the time for keeping the air charging valve open as stored in the ROM 25 will be typically like the graphs respectively illustrated in FIGS. 10 and 11. If summarily stated, the greater the absolute value of $\Delta P$, the greater the extent of openness of the air charging valve and the time for keeping the air charging valve open. Conversely, the smaller the absolute value of $\Delta P$, the smaller the extent of openness of the air charging valve and the time for keeping the air charging valve open. Each of the extent of openness of the air charging valve and the time for keeping the air charging valve open is linearly proportional to $\Delta P$.

Now, a processing for reducing the pneumatic pressure of a tire to be carried out in [Step S44] by following the flow chart of FIG. 23 will be described by referring to FIG. 23.

[Step S44-1]

In this step, the control unit 19 reads the extent of openness of the valve and the time for keeping the valve open stored in the ROM 25 in advance.

[Step S44-2]

The control unit 19 transmits a control signal representing the extent of openness of the valve it has read from the ROM 25 to the valve drive section 20, which transmits a drive signal for controlling the openness of the valve to the air discharging valve 18 in response to the control signal so that the extent of openness of the air discharging valve 18 correctly corresponds to the pressure difference ΔP.

[Step S44-3]

The control unit 19 measures the time of keeping the valve 18 open as a function of the pressure difference ΔP.

[Step S44-4]

When the specified time of keeping the valve open has passed, the control unit 19 controls the valve drive section 20 so as to shut the air discharging valve 18. The tire has been partly discharged of air at a rate corresponding to the specified openness of the valve and for the specified time for keeping the valve open.

Note that the relationship between the pressure difference ΔP and the extent of openness of the air discharging valve 18 and the relationship between ΔP and the time for keeping the air discharging valve 18 open as stored in the ROM 25 will be typically like the graphs respectively illustrated in FIGS. 10 and 11. If summarily stated, the greater the absolute value of ΔP, the greater the extent of openness of the air discharging valve and the time for keeping the air discharging valve open. Conversely, the smaller the absolute value of ΔP, the smaller the extent of openness of the air discharging valve 18 and the time for keeping the air discharging valve 18 open. Each of the extent of openness of the air discharging valve 18 and the time for keeping the air discharging vale open is linearly proportional to ΔP.

Figure 21:
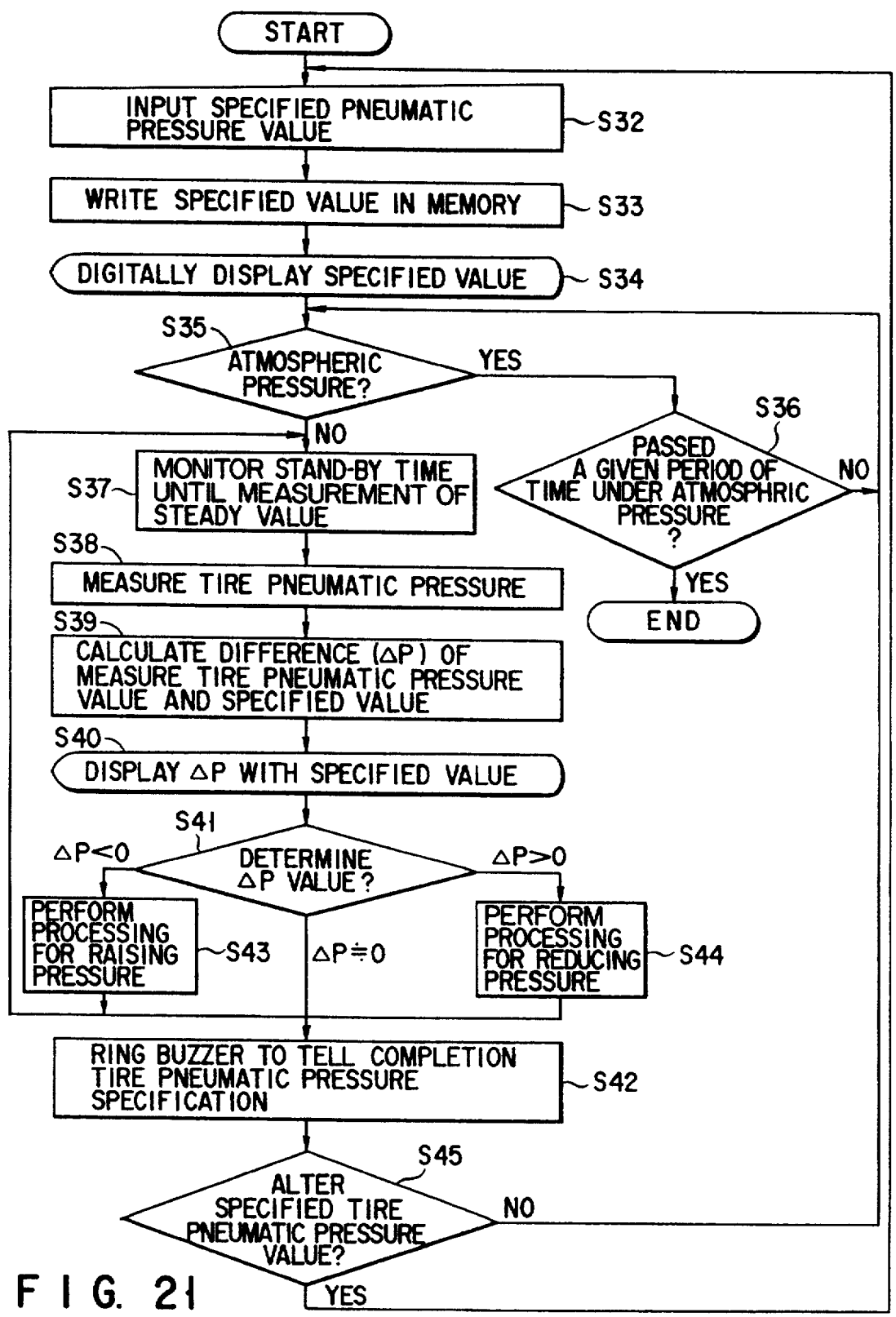
FIG. 21 is a flow chart illustrating a pneumatic pressure regulating operation of the third embodiment.
Figures 22, 23:
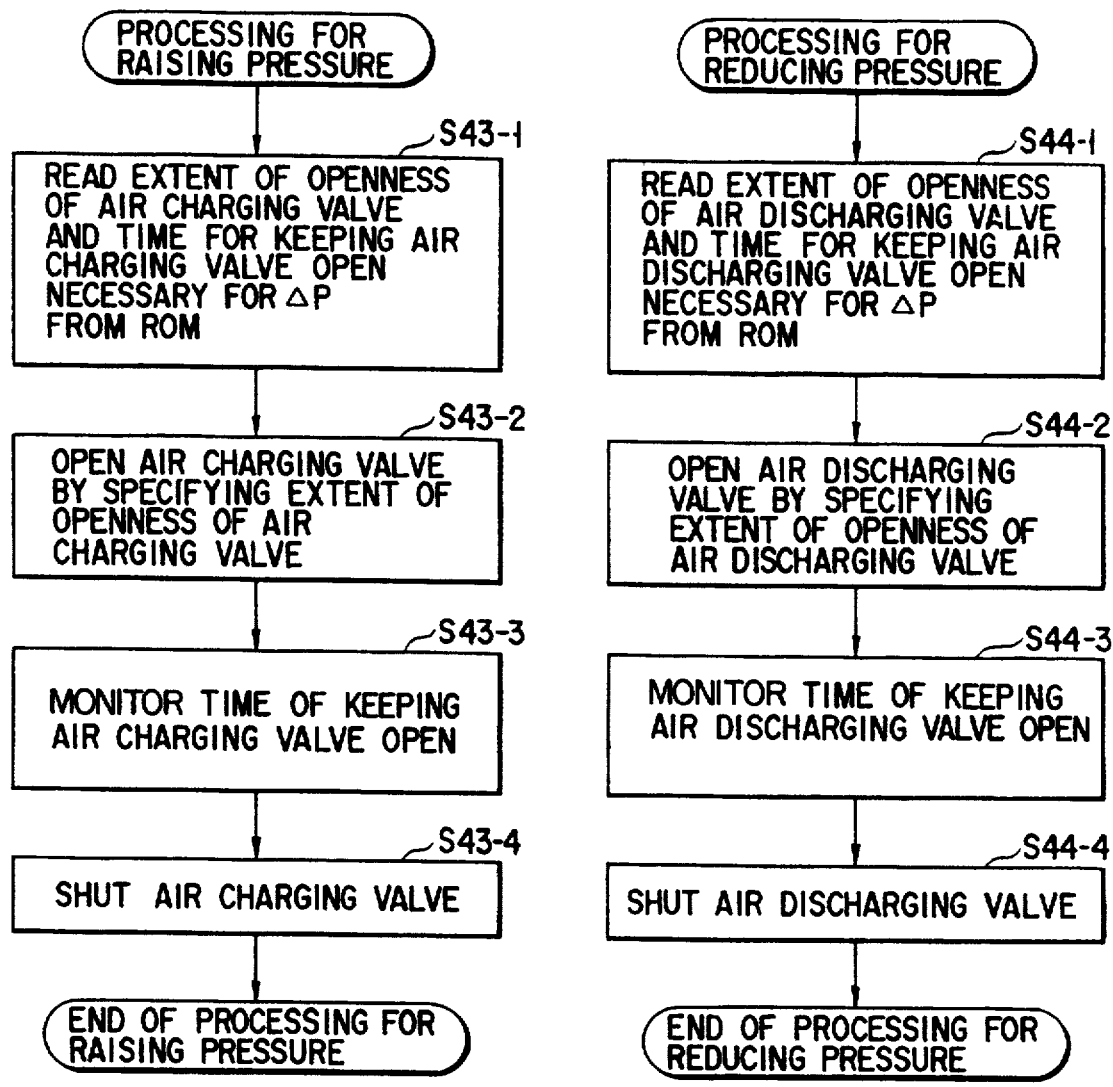
FIG. 22 is a flow chart illustrating a pneumatic pressure raising operation of the third embodiment.
FIG. 23 is a flow chart illustrating a pneumatic pressure reducing operation of the third embodiment.

FIG. 24 is a timing chart for measuring the pneumatic pressure of a tire and operating the air charging valve 17 or the air discharging valve 18 when the operation of charging a tire with air or discharging air from a tire is carried out following the appropriate ones of the flow charts of FIGS. 21 through 23. The pneumatic pressure is measured for the first time in [Step S38] (A in FIG. 24) and then a processing for raising or reducing pressure is carried out as a function of ΔP in [Step S43] or [Step S44] respectively (B in FIG. 24). In [Step S37], the stand-by time required for the signal from the pressure sensor to become stabilized is measured (C in FIG. 24) and, thereafter, the above procedures are repeated. Since the absolute value of ΔP decreases each time a pressure raising or reducing processing is carried out, the time for keeping the valve open will be shortened gradually and the operation of regulating the pneumatic pressure will become a fine tuning operation.

As described above, once a specified pneumatic pressure value is externally given to the third embodiment by way of the specified value input section 11 of the pneumatic pressure regulating unit 5, the pressure sensor 15 measures the actual pneumatic pressure of a tire 8 and the control unit 19 calculates the pressure difference ΔP between the measured pneumatic pressure of the tire 8 and the specified value and controls the extent of openness of the air charging valve 17 or the air discharging valve 18 and the time for keeping the valve open as a function of ΔP until the pneumatic pressure of the tire 8 reaches the specified level.

As the operator of the above described third embodiment is exempted from any manual work for regulating the pneumatic pressure of each of the tires of a motor vehicle and he or she only has to enter one or two specified pneumatic pressure values into the apparatus by way of the specified value input section 11, the efficiency with which the entire operation of regulating the tires of a motor vehicle proceeds will be enormously improved.

Additionally, due to the fact that the pneumatic pressure regulating unit 5 is arranged in the proximity of the tire valve connecting section 7, the operator is not required to move around on the floor to perform the assignments. Thus, the operator can easily carry out the work of regulating the pneumatic pressure of the tires of a motor vehicle including entering, if any, newly specified pneumatic pressure values into the apparatus.

Since the pneumatic pressure value specified for the current operation of regulating the pneumatic pressure of the tires of a motor vehicle is displayed on the display unit 13, the operator can visually confirm the specified value to avoid any error in specifying a pneumatic pressure value. Still additionally, since the pressure difference ΔP between the specified pneumatic pressure and the actual pneumatic pressure measured by the pressure sensor 15 is displayed on the digital display member 12b along with the specified pneumatic pressure each time the pneumatic pressure is measured, the operator will never fail to recognize that there is a pressure difference, if any, and the operation of regulating the pneumatic pressure of the tires of a motor vehicle is still going on.

Since the buzzer 22 of the embodiment is so designed that it sounds whenever the operation of regulating the pneumatic pressure of the tires of a motor vehicle is completed, the operator can easily recognize the end of a pneumatic pressure regulating operation.

While the tire valve connecting section 7 of the above third embodiment is constantly held open, it may alternatively be kept closed.

Now, a fourth embodiment of the invention will be described by referring to FIGS. 13 through 15, FIGS. 18A through 21 and FIGS. 27 and 28.

In this embodiment, the display window 12 comprises a digital display member 12a for displaying a specified pneumatic pressure value and a plurality of light emitting elements (LEDs) arranged in a row below the display member 12a as illustrated in FIG. 13.

The light emitting elements 12c may be utilized in such a manner that the pressure difference ΔP between the specified pneumatic pressure value and the actual pneumatic pressure value measured by the pressure sensor 15 is indicated by the number of LEDs. One LED may be activated as illustrated in FIG. 14 or, numbers of LEDs may be activated as illustrated in FIG. 15.

In this fourth embodiment, the LEDs flash to inform the operator of the fact that the apparatus is carrying out a pressuring raising or reducing operation.

Since the fourth embodiment differs from the above third embodiment only in part of the operation of the control unit 19 for controlling the display unit, only the portions that are different from the third embodiment will be described below and the description for the remaining portions will be omitted.

Figures 25, 26:
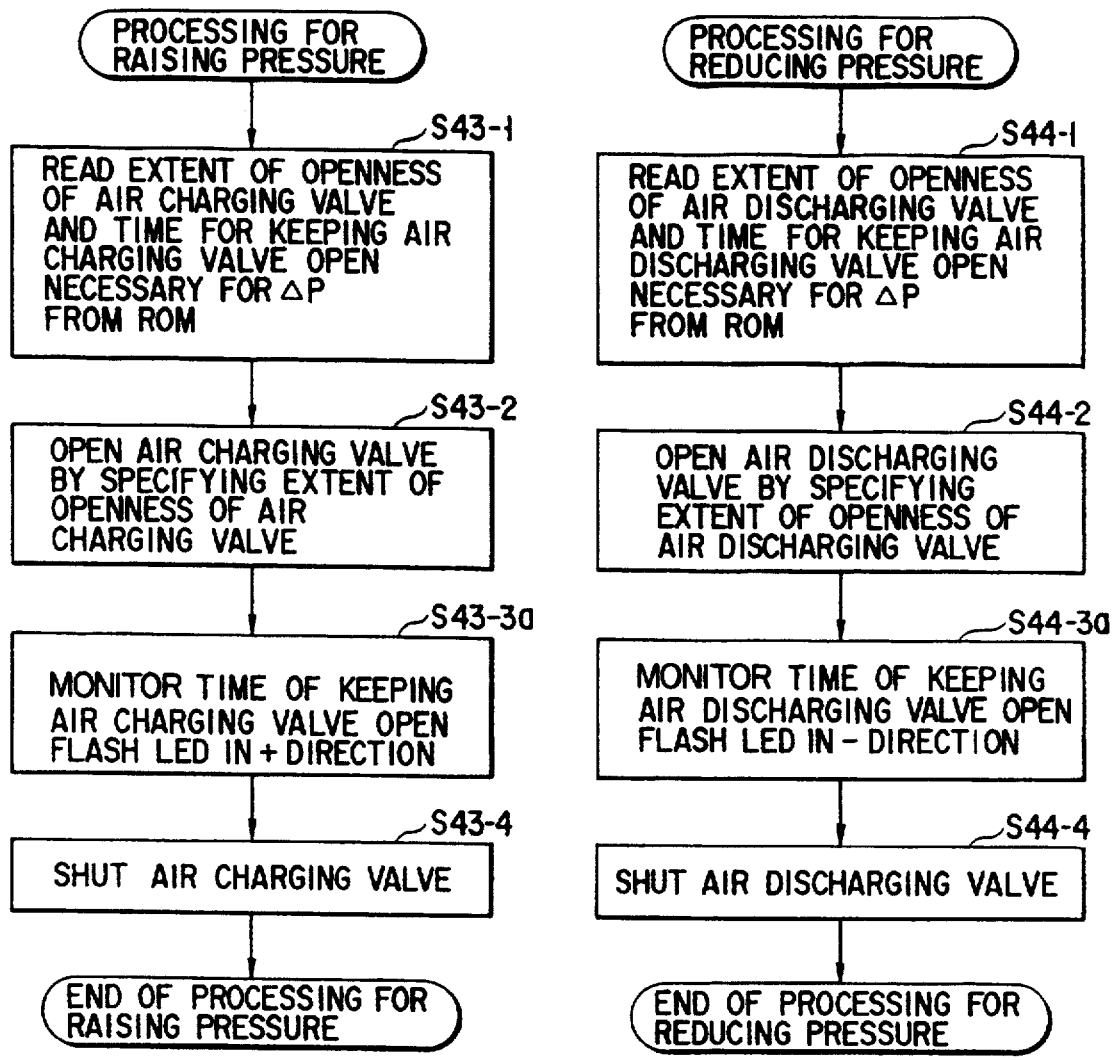
FIG. 25 is a flow chart illustrating a pneumatic pressure raising operation of a fourth embodiment of the invention.
FIG. 26 is a flow chart illustrating a pneumatic pressure reducing operation of the fourth embodiment.
Figure 33A:
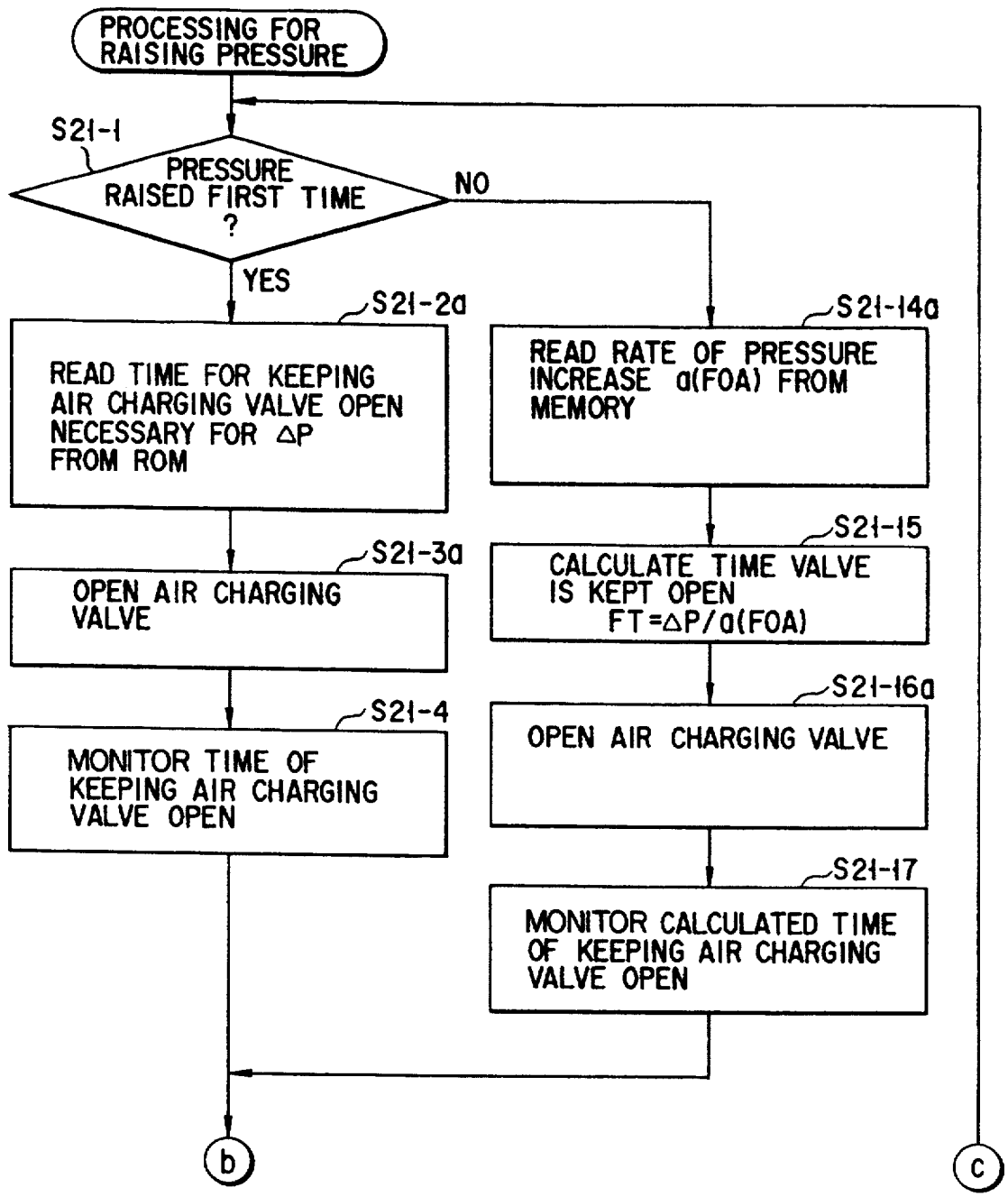
FIGS. 33A and 33B are portions of a flow chart illustrating a pneumatic pressure raising operation of the fifth embodiment.
Figure 33B:
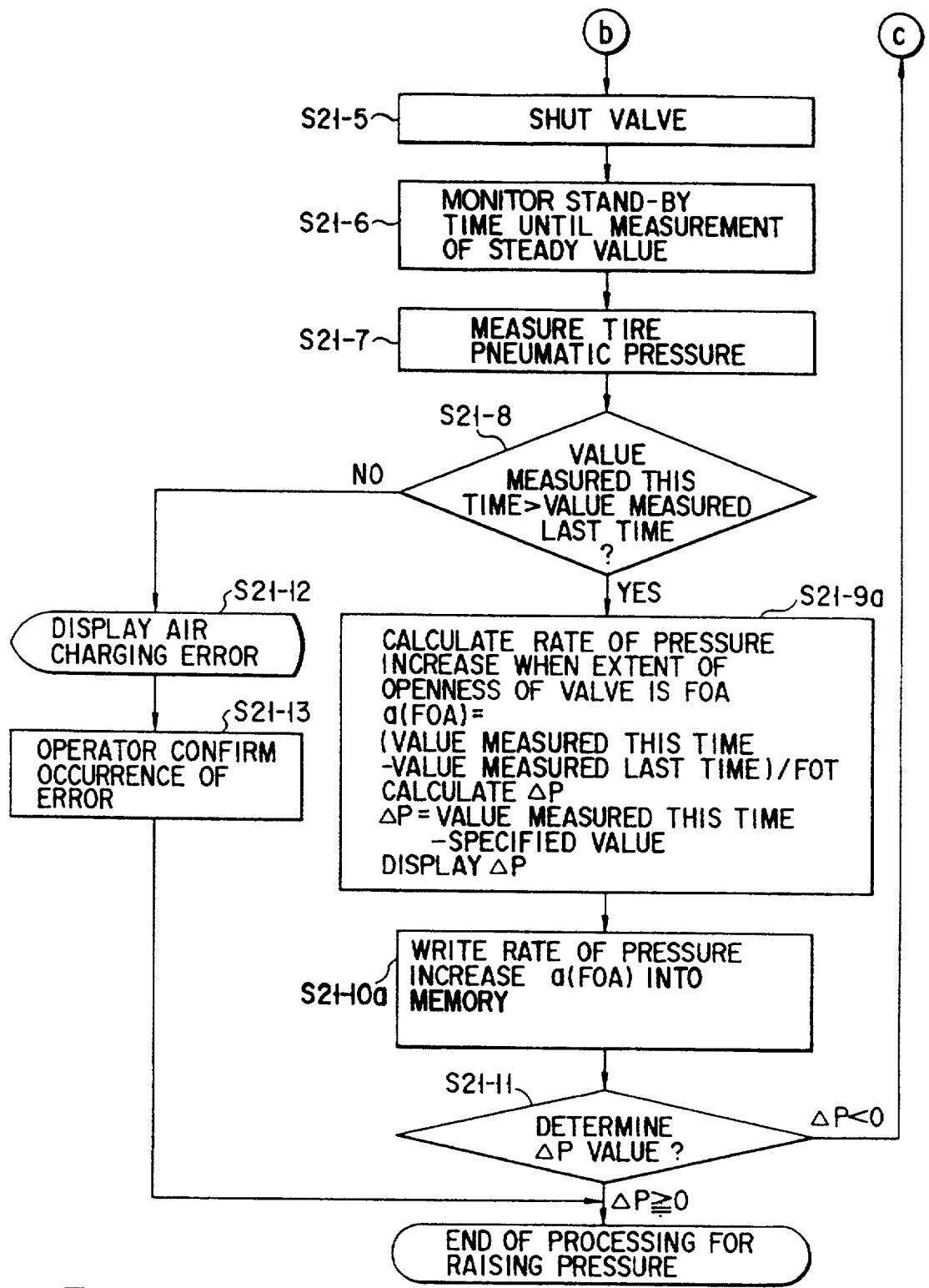
Figure 34B:
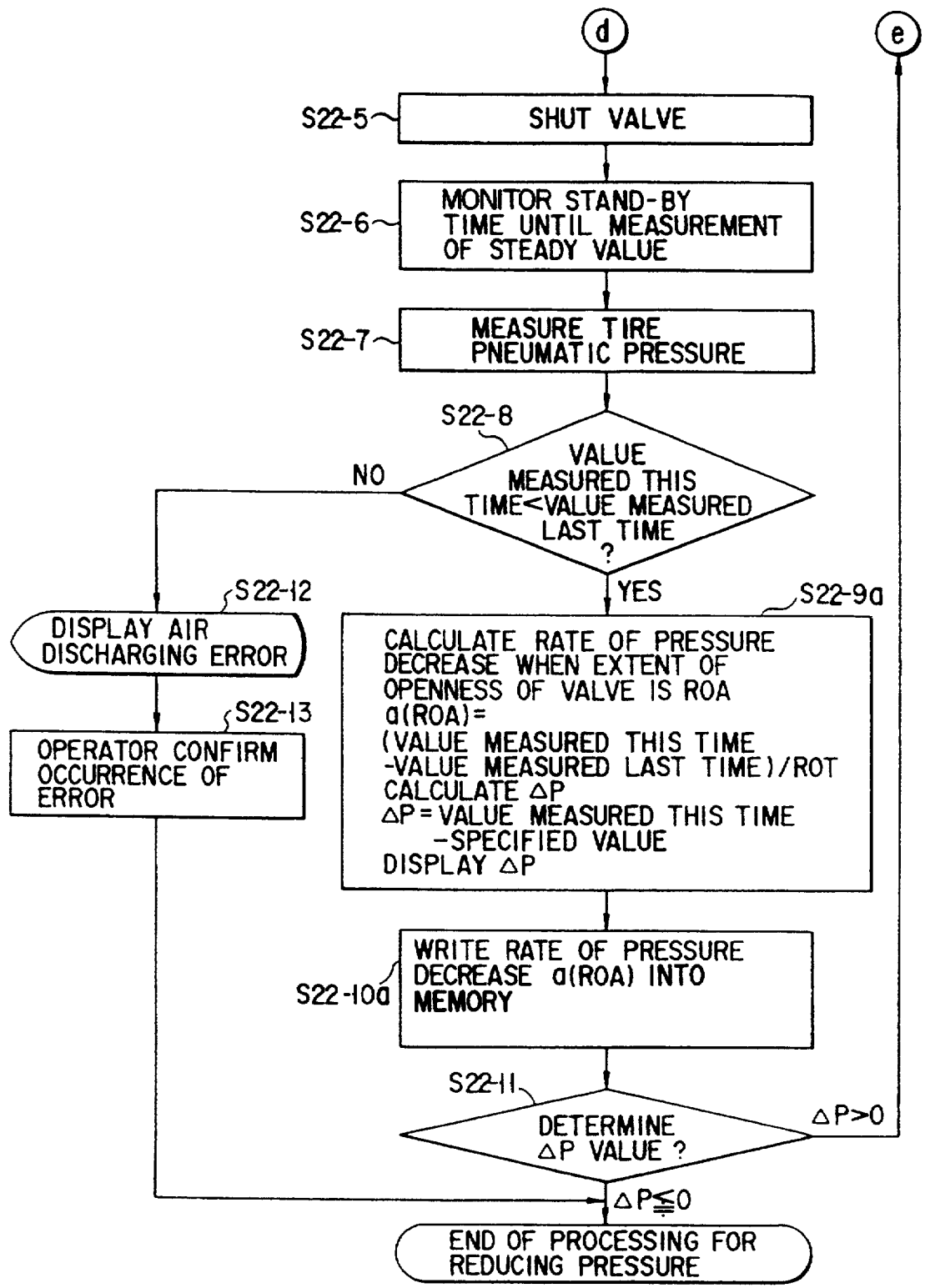

FIG. 25 is a flow chart for a pressure raising processing corresponding to that of FIG. 22 of the third embodiment. Note that [Step S43-3] of FIG. 22 is modified to make [Step 43-3a] in FIG. 25.

[Step S43-3a]

The control unit 19 measures the time of keeping the air charging valve 17 open as a function of the pressure difference ΔP.

Additionally, it flashes the light emitting elements 12c in the + direction. While FIGS. 18A through 18E illustrates light emitting elements 12c flashing in the − direction, they flash in the opposite direction or in the + direction in this step.

FIG. 26 is a flow chart for a pressure reducing processing corresponding to that of FIG. 23 for the third embodiment. Note that [Step S44-3] in FIG. 23 is modified to make [Step S44-3a] in FIG. 26.

[Step S44-3a]

The control unit 19 measures the time of keeping the air discharging valve 18 open as a function of the pressure difference ΔP.

Additionally, it flashes the light emitting elements 12c to indicate the pressure difference ΔP as shown in FIG. 14 or 15.

The way of flashing the light emitting elements 12c while calculating the time for keeping the valve open may be modified to appear as those in FIGS. 19A through 19J.

while the ROM 25 stores map data including those for a graph showing a typical relationship between the pressure difference ΔP and the extent of openness of a valve as illustrated in FIG. 10 and a relationship between ΔP and the time for keeping the valve open as shown in FIG. 11 in the above described first through fourth embodiments, the ROM 25 may only store map data concerning the relationship between ΔP and the time for keeping a valve open typically as illustrated in FIGS. 28 through 32 if simply structured valves that can only be opened or closed (ON-OFF valves) are used for the air charging and discharging valves.

Now, a fifth embodiment of the invention will be described by referring to FIGS. 33A, 33B, 34A, 34B. Note that [Step S21-2], [Step S21-3], [Step S21-14], [Step S21-16] of FIG. 6A and [Step S22-2], [Step S22-3], [Step S22-4], [Step S22-14], [Step S22-16] of FIG. 7A for the first embodiment are respectively modified to make [Step S21-2a], [Step S21-3a], [Step S21-14a], [Step S21-16a] in FIG. 33A and [Step S22-2a], [Step S22-4a], [Step S22-14a], [Step S22-16a] in FIG. 34A. And not that [Step S21-10] of FIG. 16B and [Step S22-10] of FIG. 17B for the second embodiment are respectively modified to make [Step S21-10a] in FIG. 33B and [Step S22-10a] in FIG. 34B.

[Step S21-2a]

In this step, the control unit 19 reads the time $F_{OT}$ for keeping the air charging valve open corresponding to the pressure difference ΔP and stored in advance in the ROM 25.

[Step S21-3a]

The valve drive section 20 opens the air charging valve 17.

[Step S21-10a]

The control unit 19 writes the rate of pressure change of a(FOA) in the RAM 24.

[Step S21-14a]

If it is determined in the above [Step S21-1] that the processing for raising the pneumatic pressure to be carried out is not the first one in the current operation, the control unit 19 reads the rate of pressure change a(FOA) from the RAM 24.

[Step S21-16a]

The valve drive section 20 opens the air charging valve 17.

[Step S22-2a]

In this step, the control unit 19 reads the time $R_{OT}$ for keeping the air discharging valve open corresponding to the pressure difference ΔP and stored in advance in the ROM 25.

[Step S22-3a]

The valve drive section 20 opens the air discharging valve 18.

[Step S22-10a]

The control unit 19 writes the rate of pressure change a(ROA) in the RAM 24.

[Step S22-14a]

If it is determined in the above [Step S22-1] that the processing for reducing the pneumatic pressure to be carried out is not the first one in the current operation, the control unit 19 reads the rate of pressure change a(ROA) from the RAM 24.

[Step S22-16a]

The valve drive section 20 opens the air discharging valve 18.

Figure 35:
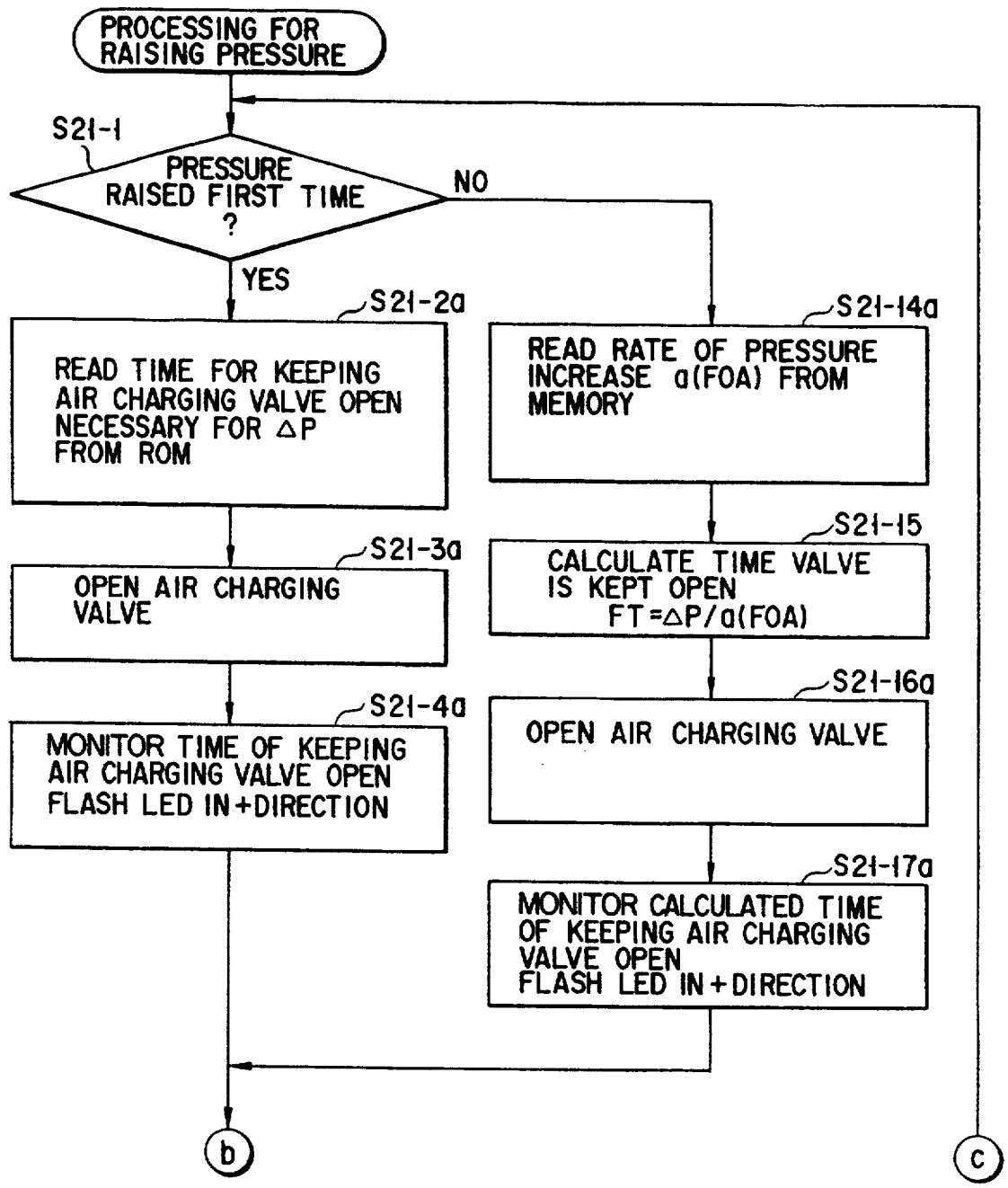
FIG. 35 is a portion of a flow chart illustrating a pneumatic pressure raising operation of a sixth embodiment of the invention.
Figure 36:
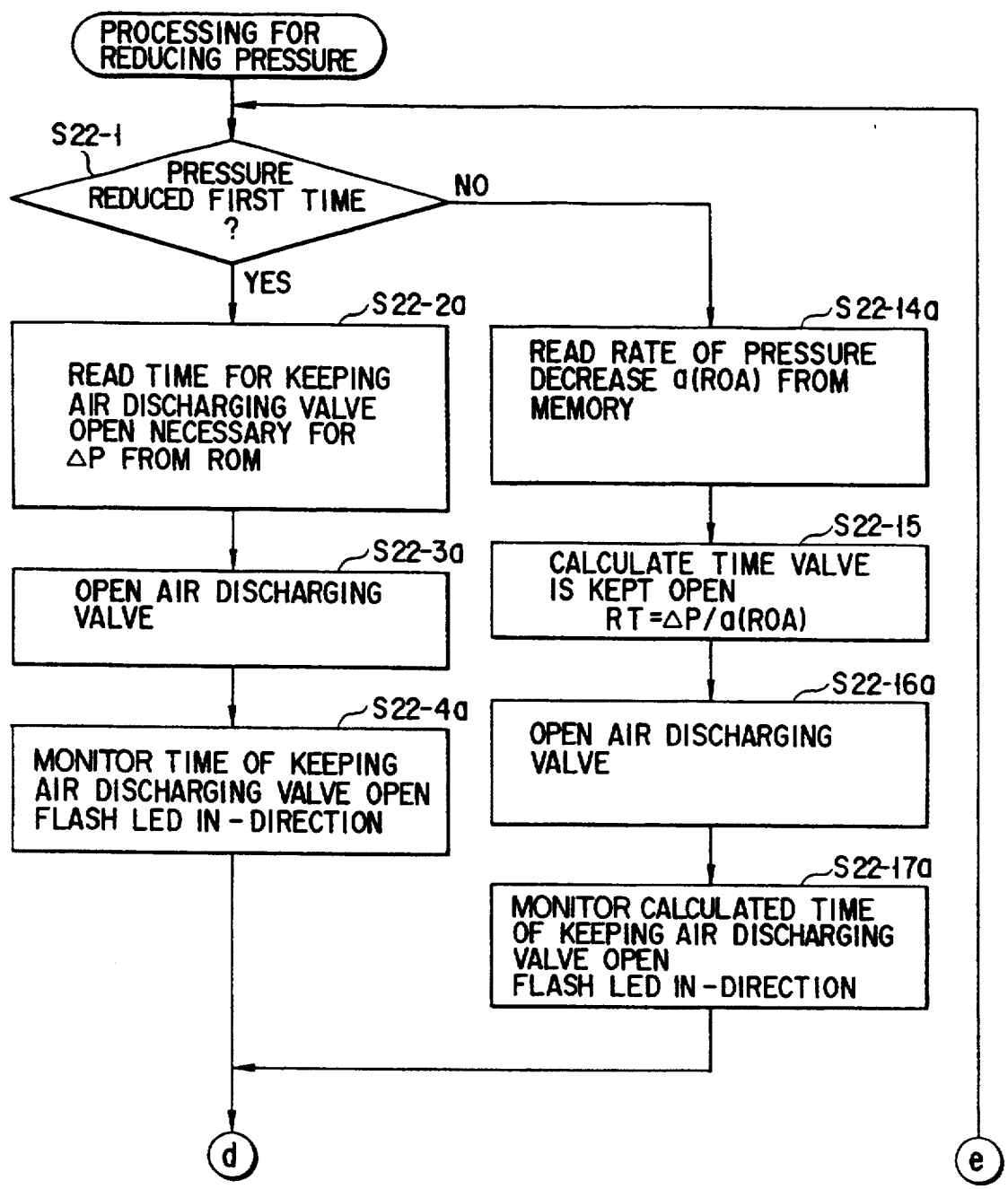
FIG. 36 is a portion of a flow chart illustrating a pneumatic pressure reducing operation of the sixth embodiment.

Now, a sixth embodiment of the invention will be described by referring to FIGS. 35 and 36. Note that [Step S21-2], [Step S21-3], [Step S21-14], [Step S21-16] of FIG. 16A and [Step S22-2], [Step S22-3], [Step S22-14], [Step S22-16] of FIG. 17A for the second embodiment are respectively modified to make [Step S21-2a], [Step S21-3a], [Step S21-14a], [Step S21-16a] in FIG. 35 and [Step S22-2a], [Step S22-4a], [Step S22-14a], [Step S22-16a] in FIG. 36. And note that the rest part of FIGS. 35 and 36 are the same as FIGS. 33B and 34B respectively.

[Step S21-2a]

In this step, the control unit 19 reads the time $F_{OT}$ for keeping the air charging valve open corresponding to the pressure difference ΔP and stored in advance in the ROM 25.

[Step S21-3a]

The valve drive section 20 opens the air charging valve 17.

[Step S21-14a]

If it is determined in the above [Step S21-1] that the processing for raising the pneumatic pressure to be carried out is not the first one in the current operation, the control unit 19 reads the rate of pressure change a(FOA) from the RAM 24.

[Step S21-16a]

The valve drive section 20 opens the air charging valve 17.

[Step S22-2a]

In this step, the control unit 19 reads the time $R_{OT}$ for keeping the air discharging valve open corresponding to the pressure difference ΔP and stored in advance in the ROM 25.

[Step S22-3a]

The valve drive section 20 opens the air discharging valve 18.

[Step S22-14a]

If it is determined in the above [Step S22-1] that the processing for reducing the pneumatic pressure to be carried out is not the first one in the current operation, the control unit 19 reads the rate of pressure charge a(ROA) from the RAM 24.

[Step S22-16a]

The valve drive section 20 opens the air discharging valve 18.

Now, a seventh embodiment of the invention will be described by referring to FIGS. 37 and 38. Note that Step S43-1], [Step S43-2] of FIG. 22 and [Step S44-1], Step S44-2] of FIG. 23 for the third embodiment are respectively modified to make [Step S43-1a], [Step S43-

2a] in FIG. 37 and [Step S44-1a], [Step S44-2a] in FIG. 38.

[Step S43-1a]

In this step, the control unit 19 reads the time $F_{OT}$ for keeping the air charging valve open corresponding to the pressure difference $\Delta P$ and stored in advance in the ROM 25.

[Step S43-2a]

The valve drive section 20 opens the air charging valve 17.

[Step S44-1a]

In this step, the control unit 19 reads the time $R_{OT}$ for keeping the air discharging valve open corresponding to the pressure difference $\Delta P$ and stored in advance in the ROM 25.

[Step S44-2a]

The valve drive section 20 opens the air discharging valve 18.

Figures 39, 40:
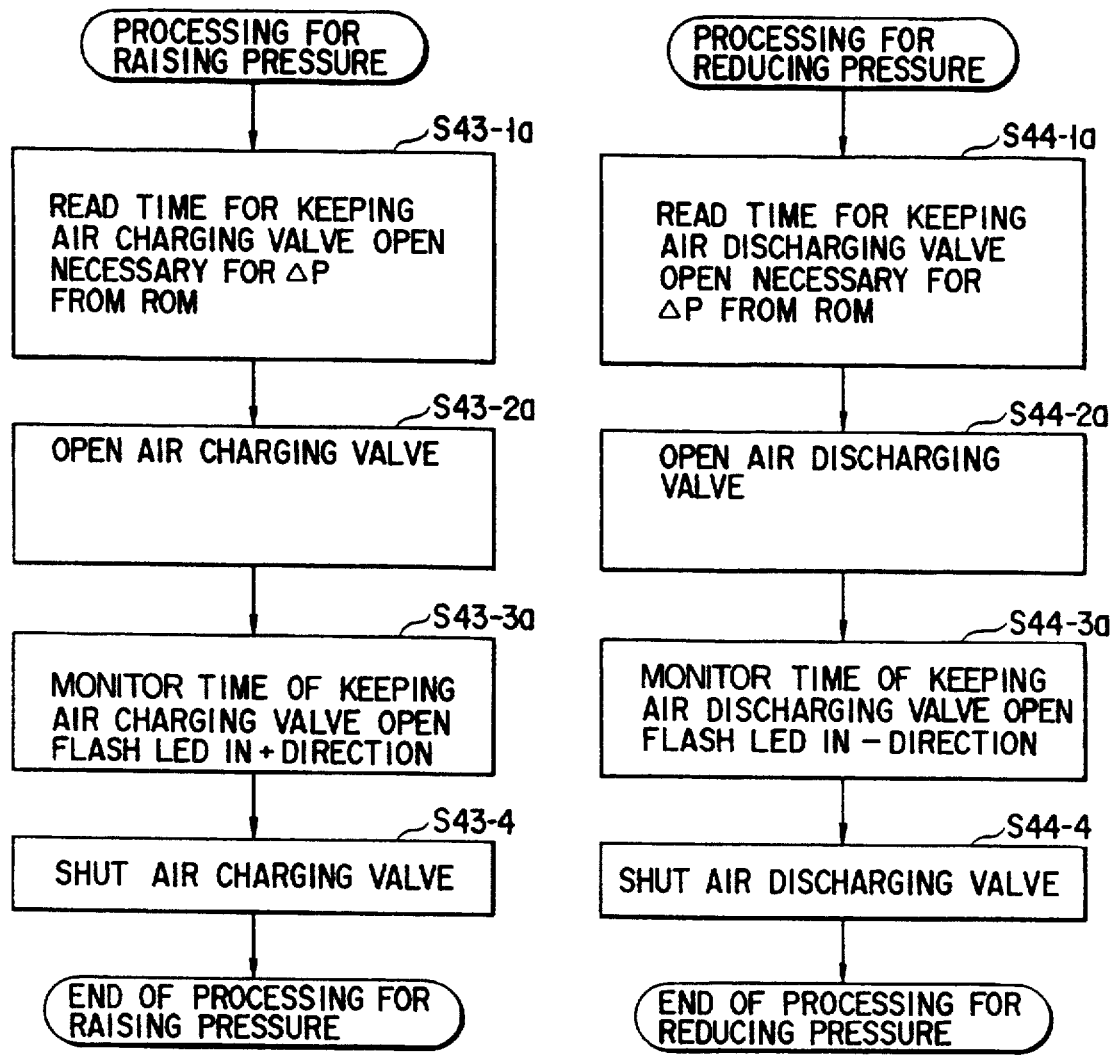
FIG. 39 is a flow chart illustrating a pneumatic pressure raising operation of an eighth embodiment of the invention.
FIG. 40 is a flow chart illustrating a pneumatic pressure reducing operation of the eighth embodiment.
Figure 41:
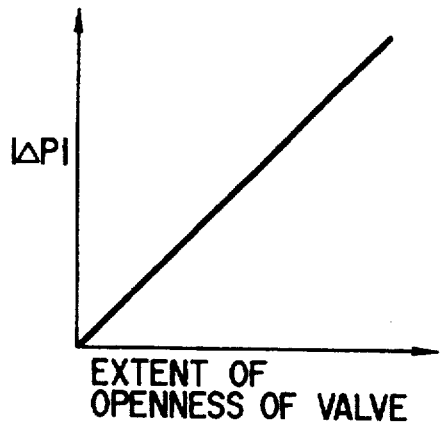
FIGS. 41 through 45 are graphs showing different relationships between the absolute value of the pressure difference ΔP between the specified pneumatic pressure level and the measured pneumatic pressure level of a motor vehicle tire and the extent of openness of a valve of a ninth embodiment of the invention at the time of the initial specification of a pneumatic pressure level.
Figure 42:
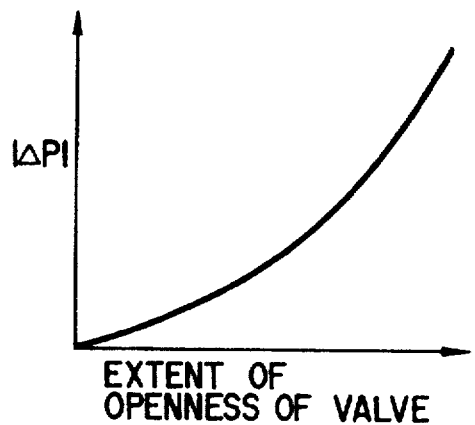
Figure 43:
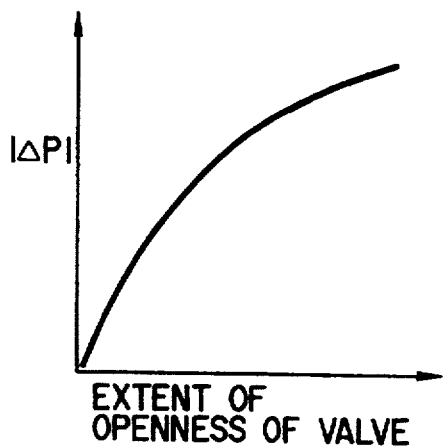
Figure 44:
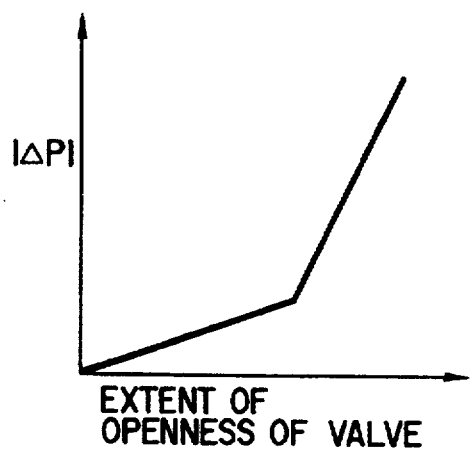
Figure 45:
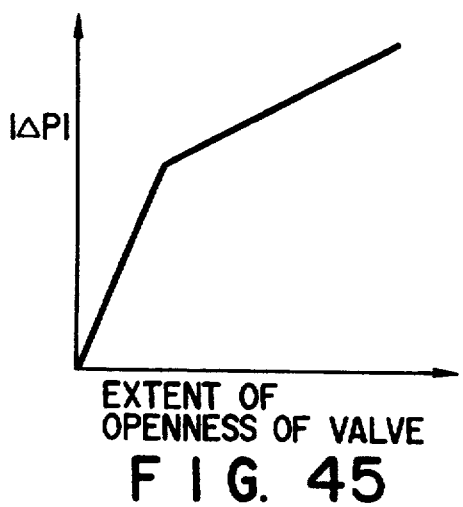

Now, an eighth embodiment of the invention will be described by referring to FIGS. 39 and 40. Note that [Step S43-1], [Step S43-2] of FIG. 25 and [Step S44-1], [Step S44-2] of FIG. 26 for the fourth embodiment are respectively modified to make [Step S43-1a], [Step S43-2a] in FIG. 39 and [Step S44-1a], [Step S44-2a] in FIG. 40.

[Step S43-1a]

In this step, the control unit 19 reads the time $F_{OT}$ for keeping the air charging valve open corresponding to the pressure difference $\Delta P$ and stored in advance in the ROM 25.

[Step S43-2a]

The valve drive section 20 opens the air charging valve 17.

[Step S44-1a]

In this step, the control unit 19 reads the time $R_{OT}$ for keeping the air discharging valve open corresponding to the pressure difference $\Delta P$ and stored in advance in the ROM 25.

[Step S44-2a]

The valve drive section 20 opens the air discharging valve 18.

While the ROM 25 stores map data including those for a graph showing a typical relationship between the pressure difference $\Delta P$ and the extent of openness of a valve as illustrated in FIG. 10 and a relationship between $\Delta P$ and the time for keeping the valve open as shown in FIG. 11 in the above described first through fourth embodiments, the ROM 25 may only store map data concerning the relationship between $\Delta P$ and the extent of openness of a valve typically as illustrated in FIGS. 41 through 45 if simply structured valves that can only be opened for a predetermined period of time and is capable of being controlled for the extent of openness are used for the air charging and discharging valves according to ninth and tenth embodiments described later.

Figures 46, 47:
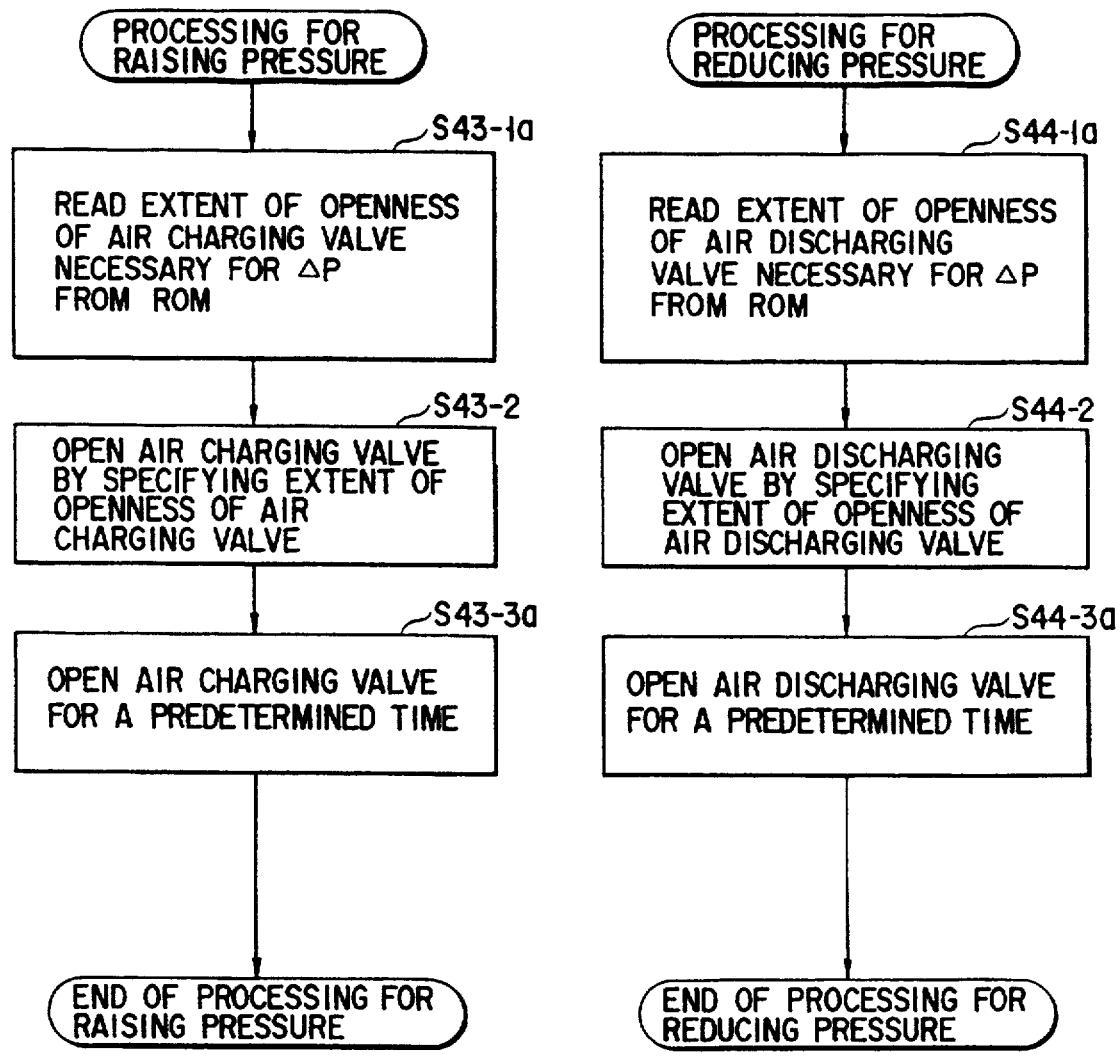
FIG. 46 is a flow chart illustrating a pneumatic pressure raising operation of a ninth embodiment.
FIG. 47 is a flow chart illustrating a pneumatic reducing operation of the ninth embodiment.

NOW, a ninth embodiment of the invention will be described by referring to FIGS. 46 and 47. Note that [Step S43-1], [Step S43-3] and [Step S43-4] of FIG. 22 and [Step S44-1], [Step S44-3] and [Step S44-4] of FIG. 23 for the third embodiment are respectively modified to make [Step S43-1a], [Step S43-3a] in FIG. 46 and [Step S44-1a], [Step S44-3a] in FIG. 47.

[Step S43-1a]

In this step, the control unit 19 reads the extent of openness of the air charging valve corresponding to the pressure difference $\Delta P$ and stored in advance in the ROM 25.

[Step S43-3a]

The valve drive section 20 keeps the air charging valve 17 open for a predetermined time.

[Step S44-1a]

In this step, the control unit 19 reads the extent of openness of the air discharging valve open corresponding to the pressure difference $\Delta P$ and stored in advance in the ROM 25.

[Step S44-3a]

The valve drive section 20 keeps the air discharge valve 18 open for a predetermined time.

Figures 48, 49:
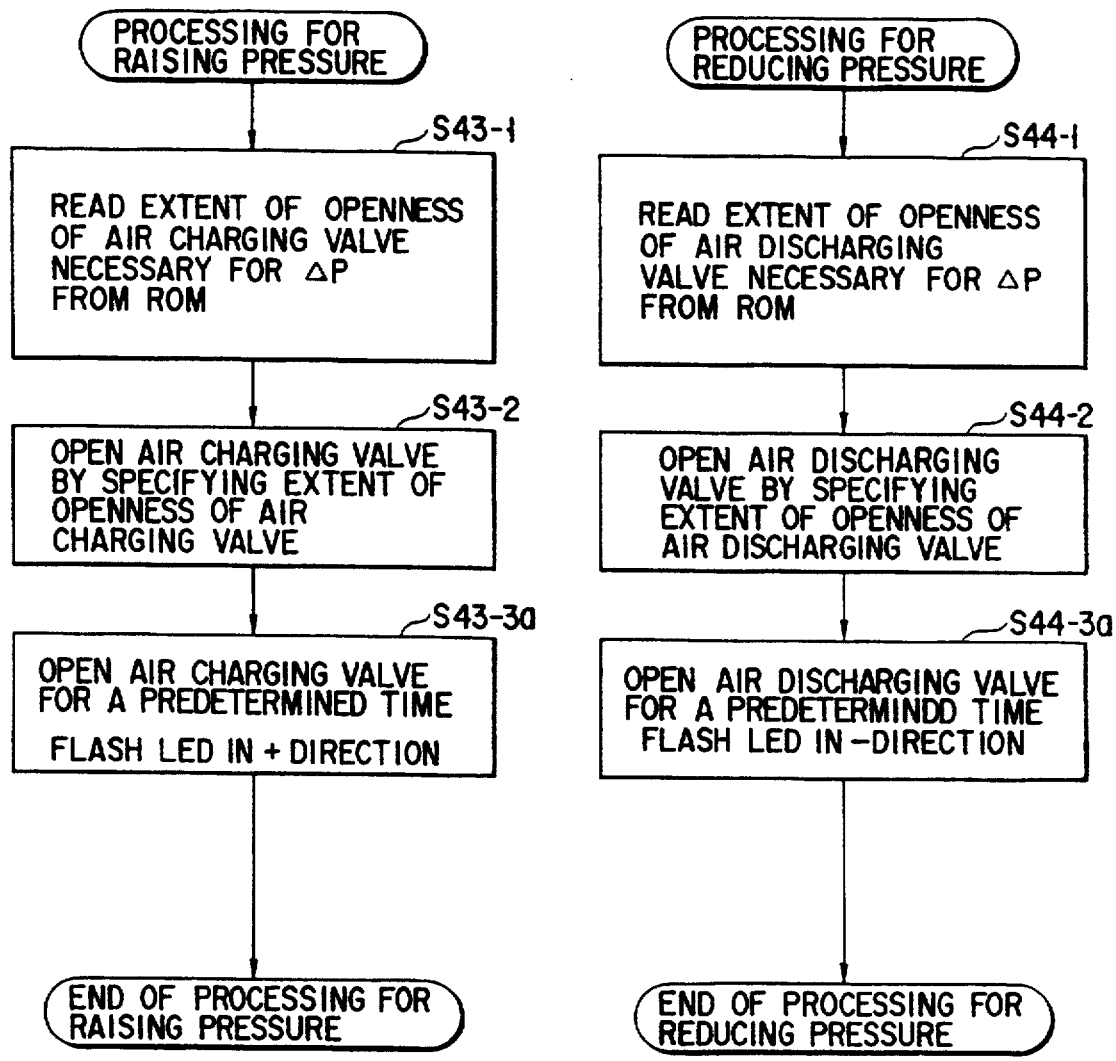
FIG. 48 is a flow chart illustrating a pneumatic pressure raising operation of a tenth embodiment of the invention.
FIG. 49 is a flow chart illustrating a pneumatic pressure reducing operation of the tenth embodiment.

Now, a tenth embodiment of the invention will be described by referring to FIGS. 48 and 49. Note that [Step S43-1], [Step S43-3] and [Step S43-4] of FIG. 25 and [Step S44-1], [Step S44-3] and [Step S44-4] of FIG. 26 for the fourth embodiment are respectively modified to make [Step S43-1a], [Step S43-3a] in FIG. 48 and [Step S44-1a], [Step S44-3a] in FIG. 49.

[Step S43-1a]

In this step, the control unit 19 reads the extent of openness of the air charging valve corresponding to the pressure difference $\Delta P$ and stored in advance in the ROM.

[Step S43-3a]

The valve drive section 20 keeps the air charging valve 17 open for a predetermined time, the control unit 19 flashes the light emitting elements 12c in the + direction.

[Step S44-1a]

In this step, the control unit 19 reads the extent of openness of the air discharging valve open corresponding to the pressure difference $\Delta P$ and stored in advance in the ROM 25.

[Step S44-3a]

The valve drive section 20 keeps the air discharging valve 18 open for a predetermined time. The control unit 19 flashes the light emitting elements 12c in the − direction.

The display window 12 as illustrated in FIG. 13 may be modified to make a one as shown in FIG. 50, where an analog meter 12d is arranged below the digital display member 12a and the pressure difference is indicated by the analog meter 12d.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for regulating the pneumatic pressure of a tire comprising:

a pneumatic pressure source for storing compressed air;

connecting means adapted to open a tire valve of a tire when connected thereto;

input means for entering a specified pneumatic pressure value;

pneumatic pressure measuring means for measuring the pneumatic pressure of the tire;

an air charge valve for allowing or preventing communication between said connecting means and said pneumatic pressure source;

an air discharge valve for allowing or preventing communication between said connecting means and the atmosphere;

valve drive means for controlling said air charge valve and said air discharge valve;

first memory means for storing values for the extent of openness of the valves and the time for keeping the valves open in accordance with respective values of a pressure difference determined between the entered specified pneumatic pressure value and the pneumatic pressure level of the tire measured by said pneumatic pressure measuring means; and control means for reading at least one of said stored values in said first memory means which corresponds to a determined value of the pressure difference and raising or reducing the pneumatic pressure of the tire by controlling the valve drive means in accordance with said read value;

wherein said valve drive means controls the extent of openness of the valves and the time for keeping the valves open;

said control means comprises:

first pneumatic pressure regulating means for reading from said memory means a value for the extent of openness of the valve and a value for the time for keeping the valve open which correspond to the pressure difference between the specified pneumatic pressure value stored in the memory means by way of said input means and the actual pneumatic pressure of the tire measured by said pneumatic pressure measuring means to control said valve drive means and operate said air charging valve or air discharging valve with said values of the extent of openness of the valve and the time for keeping the valve open;

rate of pressure change calculating means for calculating the rate of change in the pneumatic pressure of the tire in initial stages of operation of said first pneumatic pressure regulating means;

second memory means for storing said value for the extent of openness of the valve and said calculated rate Of change in the pneumatic pressure;

first pressure difference calculating means for calculating the pressure difference between the specified pneumatic pressure value and the actual pneumatic pressure value of the tire measured after the end of the operation of said first pneumatic pressure regulating means;

second pneumatic pressure regulating means for determining the time for keeping the valve open by dividing the pressure difference calculated by said pressure difference calculating means by said calculated rate of change to control said valve drive means and operate said air charging valve or air discharging valve with said stored value for the extent of openness of the valve and said determined value for the time for keeping the valve open;

second pressure difference calculating means for calculating the pressure difference between the specified pneumatic pressure value and the actual pneumatic pressure value of the tire measured after the end of the operation of said second pneumatic pressure regulating means; and means for terminating the operation of said pneumatic pressure regulating means when the pressure difference calculated by said pressure calculating means comes to zero.

2. An apparatus for regulating the pneumatic pressure of a tire according to claim 1, wherein said memory means stores a single constant value for the extent of openness of the valve and incremental values for the time for keeping the valve open as a function of said pressure difference.

3. An apparatus for regulating the pneumatic pressure of a tire according to claim 1, wherein said memory means stores a single constant value for the time for keeping the valve open and incremental values for the extent of openness of the valve as a function of said pressure difference.

4. An apparatus for regulating the pneumatic pressure of a tire according to claim 1, further comprising:

display means for displaying said specified pneumatic pressure value entered through said input means and said pressure difference.

5. An apparatus for regulating the pneumatic pressure of a tire according to claim 4, wherein said display means comprises:

a digital display section for displaying said specified pneumatic pressure value;

a plurality of display elements arranged in a row for displaying said pressure difference; and said control means controlling said plurality of display elements so as to flash a selected number of display elements as a function of the calculated pressure difference, said display elements indicating a pressure increase when said air charging valve is controlled by said pneumatic pressure regulating means, and indicating a pressure decrease when said air discharging valve is controlled by said pneumatic pressure regulating means.

6. An apparatus for regulating the pneumatic pressure of a tire according to claim 4, wherein said display means comprises:

a digital display section for displaying said specified pneumatic pressure value;

an analog display section for displaying said pressure difference; and said control means controlling the analog display section in accordance with said pressure difference.

7. An apparatus for regulating the pneumatic pressure of tire according to claim 1, wherein the tire is one of a plurality of tires of which the pneumatic pressure is regulated, and wherein after a first tire is regulated, for the remaining tires of the plurality of tires said second pneumatic pressure regulating means utilizes the rate of change calculated for the first tire by said rate of pressure change calculating means.

8. An apparatus for, regulating the pneumatic pressure of a tire according to claim 7, wherein said second pneumatic pressure regulating means utilizes the rate of change calculated for the first tire when the first tire is the same as a current tire being regulated.

* * * * *